(12) United States Patent
Singh et al.

(10) Patent No.: US 10,510,452 B2
(45) Date of Patent: Dec. 17, 2019

(54) STEAM GENERATOR FOR NUCLEAR STEAM SUPPLY SYSTEM

(71) Applicant: SMR Inventec, LLC, Jupiter, FL (US)

(72) Inventors: Krishna P. Singh, Hobe Sound, FL (US); Joseph Gearald Leo Rajkumar, Marlton, NJ (US)

(73) Assignee: SMR Inventec, LLC, Jupiter, FL (US)

( * ) Notice: Subject to any disclaimer, the term of this patent is extended or adjusted under 35 U.S.C. 154(b) by 0 days.

(21) Appl. No.: 16/507,637

(22) Filed: Jul. 10, 2019

(65) Prior Publication Data
US 2019/0333651 A1  Oct. 31, 2019

Related U.S. Application Data

(62) Division of application No. 14/910,433, filed as application No. PCT/US2014/062094 on Oct. 24, 2014.

(60) Provisional application No. 61/895,267, filed on Oct. 24, 2013.

(51) Int. Cl.
*G21C 15/14* (2006.01)
*G21C 15/22* (2006.01)
(Continued)

(52) U.S. Cl.
CPC .............. *G21C 15/14* (2013.01); *F22B 1/023* (2013.01); *F22B 1/026* (2013.01); *G21C 13/04* (2013.01);
(Continued)

(58) Field of Classification Search
CPC ...... G21C 15/14; G21C 15/22; G21C 15/257; G21C 15/26; G21C 15/18; G21C 13/04;
(Continued)

(56) References Cited

U.S. PATENT DOCUMENTS 3,916,841 A * 11/1975 Schroder ................. F22B 1/025
122/32
4,039,377 A * 8/1977 Andrieu ................. G21C 1/322
376/402
(Continued)

FOREIGN PATENT DOCUMENTS

WO  WO 2013/163475  10/2013

OTHER PUBLICATIONS

Supplemental Search Report for corresponding European Application No. 14856573.2 dated Aug. 18, 2017, pp. 1-9.
(Continued)

*Primary Examiner* — Lily C Garner
(74) *Attorney, Agent, or Firm* — The Belles Group, P.C.

(57) ABSTRACT

A nuclear steam supply system utilizing gravity-driven natural circulation for primary coolant flow through a fluidly interconnected reactor vessel and a steam generating vessel. In one embodiment, the steam generating vessel includes a plurality of vertically stacked heat exchangers operable to convert a secondary coolant from a saturated liquid to superheated steam by utilizing heat gained by the primary coolant from a nuclear fuel core in the reactor vessel. The secondary coolant may be working fluid associated with a Rankine power cycle turbine-generator set in some embodiments. The steam generating vessel and reactor vessel may each be comprised of vertically elongated shells, which in one embodiment are arranged in lateral adjacent relationship. In one embodiment, the reactor vessel and steam generating vessel are physically discrete self-supporting structures which may be physically located in the same containment vessel.

20 Claims, 15 Drawing Sheets

(51) Int. Cl.
    *G21C 13/04*     (2006.01)
    *F22B 1/02*     (2006.01)
    *G21D 1/00*     (2006.01)
    *G21C 15/26*     (2006.01)
    *G21C 15/257*     (2006.01)
    *G21C 13/032*     (2006.01)
    *G21C 15/18*     (2006.01)

(52) U.S. Cl.
    CPC ........... *G21C 15/22* (2013.01); *G21C 15/257* (2013.01); *G21C 15/26* (2013.01); *G21D 1/006* (2013.01); *G21C 13/032* (2013.01); *G21C 15/18* (2013.01); *Y02E 30/40* (2013.01)

(58) Field of Classification Search
    CPC ........ G21C 13/032; F22B 1/023; F22B 1/026; F22B 1/02
    See application file for complete search history.

(56) References Cited

U.S. PATENT DOCUMENTS

| | | | | |
|---|---|---|---|---|
| 4,235,672 A * | 11/1980 | Harand | ................ | F04D 29/528 165/158 |
| 4,660,510 A * | 4/1987 | Draper | .................... | F22B 1/165 122/31.1 |
| 5,158,742 A * | 10/1992 | Dillmann | ............... | G21C 15/18 165/104.14 |
| 5,167,905 A | 12/1992 | Mentz et al. | | |
| 7,245,689 B2 * | 7/2007 | Nakayama | ............... | G21C 5/10 376/352 |
| 2011/0096890 A1 | 4/2011 | Balog | | |
| 2012/0076254 A1* | 3/2012 | Malloy | .................. | G21C 1/086 376/220 |
| 2012/0155594 A1* | 6/2012 | Malloy | .................... | G21C 7/32 376/210 |
| 2012/0170702 A1* | 7/2012 | Song | ..................... | F22B 35/004 376/210 |
| 2012/0307956 A1* | 12/2012 | Singh | ..................... | G21C 1/086 376/298 |
| 2014/0177772 A1* | 6/2014 | Jeong | ..................... | F22B 35/00 376/215 |

OTHER PUBLICATIONS

International Search Report from corresponding PCT Application No. PCT/US2014/062094, dated Feb. 6, 2015, pp. 1-16.

* cited by examiner

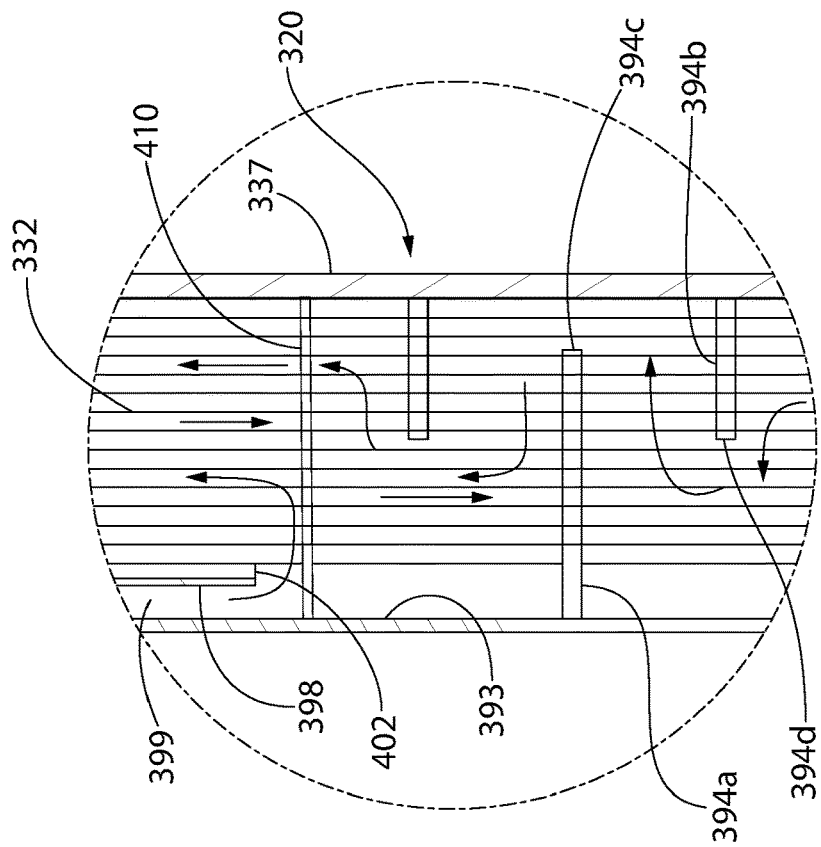
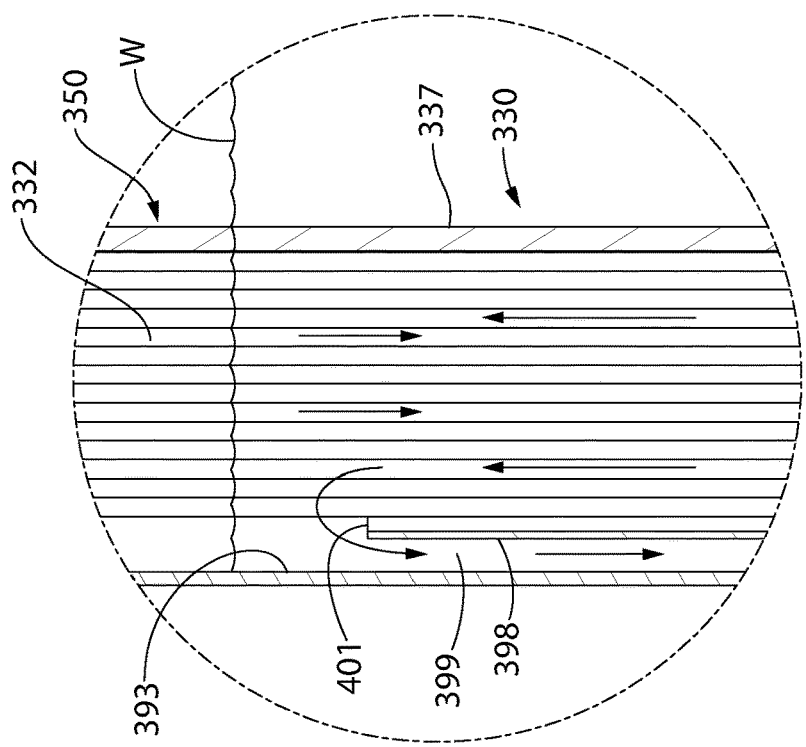

STEAM GENERATOR FOR NUCLEAR STEAM SUPPLY SYSTEM

CROSS-REFERENCE TO RELATED PATENT APPLICATIONS

The present application is a divisional of U.S. patent application Ser. No. 14/910,433 filed Feb. 5, 2016, which is a U.S. national stage application under 35 U.S.C. § 371 of PCT Application No. PCT/US2014/062094, filed Oct. 24, 2014, which claims the benefit of U.S. Provisional Patent Application Ser. No. 61/895,267 filed Oct. 24, 2013. The entireties of foregoing applications are incorporated herein by reference.

FIELD OF THE INVENTION

The present invention relates nuclear steam supply systems, and more particularly to a steam generator used in a modular reactor system having natural gravity driven coolant flow circulation.

BACKGROUND OF THE INVENTION

Pressurized water reactors (PWRs) for nuclear power generation facilities utilize both pumped and natural circulation of the primary coolant (water) to both cool the reactor core and heat the secondary coolant (water) to produce steam which may be working fluid for a Rankine power generation cycle. The existing natural circulation PWRs suffer from the drawback that the heat exchange equipment is integrated with and located within the reactor pressure vessel. Such an arrangement not only makes the heat exchange equipment difficult to repair and/or service, but also subjects the equipment to corrosive conditions and results in increased complexity and a potential increase in the number of penetrations into the reactor pressure vessel. In addition, locating the heat exchange equipment within the reactor pressure vessel creates problems with respect to radiation levels encountered for crews to repair the heat exchange equipment in proximity to the radioactively hot components of the reactor vessel. The general view has also been that the heat exchangers should be located in the reactor vessel to achieve natural circulation in those systems which may utilize this type of flow circulation.

The steam generator (SG) is a vitally important tubular heat exchanger in a pressurized water reactor (PWR). It serves to boil the purified Rankine cycle secondary coolant water (also called the "secondary" side water or feedwater) into steam using the heat energy from the reactor primary coolant heated by its circulation through the reactor's core (called the "primary" side). Because of the high operating pressure (typically over 2200 psi) of the reactor coolant, the steam generator is a massive piece of vertically arrayed equipment. The transfer of heat energy occurs from the primary fluid flowing inside the tubes to the secondary water located in the space outside the tubes.

Improvements in nuclear steam generators are desired.

SUMMARY OF THE INVENTION

The present invention provides an improved steam generator for a nuclear steam supply system.

According to one embodiment, a nuclear steam supply system with natural gravity-driven coolant circulation includes: a vertically-oriented reactor vessel comprising an elongated cylindrical shell forming an internal cavity configured for containing primary coolant and a nuclear reactor fuel core; a vertically-oriented steam generating vessel comprising an elongated cylindrical shell defining an internal cavity, a top tubesheet, and a bottom tubesheet; a vertical riser pipe extending vertically between the top and bottom tubesheets, the riser pipe fluidly connected to the reactor vessel; a plurality of heat transfer tubes extending vertically between the top and bottom tubesheets; and a fluid coupling comprising an eccentric cone section forming a flow conduit for exchanging primary coolant between the steam generating vessel and reactor vessel. A closed primary coolant loop is formed in which primary coolant flows from the reactor vessel through the eccentric cone into the steam generator vessel and returns from the steam generating vessel to the reactor vessel through the eccentric cone.

According to another embodiment, a nuclear steam supply system with natural gravity-driven coolant circulation includes: a vertically-oriented reactor vessel comprising an elongated cylindrical shell forming an internal cavity configured for containing primary coolant and a nuclear reactor fuel core; a vertically-oriented steam generating vessel comprising an elongated cylindrical shell defining an internal cavity configured for containing secondary coolant, a top tubesheet, and a bottom tubesheet; a plurality of heat transfer tubes extending vertically between the top and bottom tubesheets, the tubes including a preheater section, a steam generator section, and a superheater section, wherein secondary coolant in a liquid state enters a shell side of the preheater section at a bottom of the steam generating vessel and flows upward to the steam generator section where a portion of the secondary coolant boils to produce steam which in turn flows upward into the superheater section at a top of the steam generating vessel; a vertical riser pipe extending vertically between the top and bottom tubesheets, the riser pipe fluidly connected to the reactor vessel; a fluid coupling forming a flow conduit for exchanging primary coolant between the steam generating vessel and reactor vessel; and a tubular recirculation shroud surrounding the tubes in the steam generator section, the shroud configured to recirculate a portion of the liquid secondary coolant in the steam generator section to the preheater section. The primary coolant flows upward through the riser pipe and downward through the tubes on the tube side of the steam generating vessel to heat the secondary coolant.

According to one embodiment, a steam generator for a nuclear steam supply system includes: a vertically-oriented steam generating vessel comprising an elongated cylindrical shell defining an internal cavity configured for containing secondary coolant, a top tubesheet, a secondary coolant outlet nozzle below the top tubesheet, a bottom tubesheet, and a secondary coolant inlet nozzle above the bottom tubesheet; a plurality of heat transfer tubes extending vertically between the top and bottom tubesheets, the tubes including a preheater section, a steam generator section, and a superheater section, wherein secondary coolant in a liquid state enters a shell side of the preheater section via the inlet nozzle and flows upward to the steam generator section where a portion of the secondary coolant boils to produce steam which in turn flows upward into the superheater section and exits the steam generating vessel through the outlet nozzle; a vertical riser pipe extending vertically between the top and bottom tubesheets, the riser pipe in fluid communication with the tubes and configured for fluid coupling to a reactor vessel containing primary coolant; a double-walled fluid coupling forming a flow conduit for exchanging primary coolant between the steam generating vessel and reactor vessel, the fluid coupling configured so that primary coolant from the reactor vessel flows through the fluid coupling into the steam generator vessel and returns from the steam generating vessel to the reactor vessel through the fluid coupling; a bottom collection plenum formed below the bottom tubesheet by the fluid coupling and configured for fluid coupling to the reactor vessel, the collection plenum in fluid communication with the tubes; a top distribution plenum formed above the top tubesheet, the distribution plenum in fluid communication with the riser pipe and tubes; and a tubular recirculation shroud surrounding the tubes in the steam generator section, the shroud configured to recirculate a portion of the liquid secondary coolant in the steam generator section to the preheater section.

Advantages and aspects of the present invention include the following:

Core deep underground: The reactor core resides deep underground in a thick-walled Reactor Vessel (RV) made of an ASME Code material that has decades of proven efficacy in maintaining reactor integrity in large PWR and BWR reactors. All surfaces wetted by the reactor coolant are made of stainless steel or Inconel, which eliminates a major source of corrosion and crud accumulation in the RV.

Gravity-driven circulation of the reactor coolant: The nuclear steam supply system according to the present disclosure does not rely on any active components (viz., a Reactor Coolant pump) for circulating the reactor coolant through the core. Instead, the flow of the reactor coolant through the RV, the steam generator heat exchangers, and other miscellaneous equipment occurs by the pressure head created by density differences in the flowing water between the hot and cold segments of the primary loop. The reliability of gravity as a motive force underpins its inherent safety. The movement of the reactor coolant requires no pumps, valves, or moving machinery of any kind.

Black-start capable (no reliance on off-site power): Off-site power is not essential for starting up or shutting down the nuclear steam supply system. The rejection of reactor residual heat during the shutdown also occurs by gravity-driven circulation. Thus, the need for an emergency shutdown power supply at the site—a major concern for nuclear plants—is eliminated. Indeed, the nuclear steam supply system uses gravity (and only gravity) as the motive force to meet its operational imperatives under both normal and accident conditions.

Assurance of a large inventory of water around and over the reactor core: The present nuclear steam supply system reactor vessel (RV) has no penetrations except at its very top, which means that the core will remain submerged in a large inventory of water even under the hypothetical postulated event under which all normal heat rejection paths are lost.

No large penetrations in the Reactor Vessel (RV): All penetrations in the RV are located in the top region of the RV and are small in size. The absence of large piping in the reactor coolant system precludes the potential of a "large break" Loss of Coolant Accident (LOCA) event.

Easy accessibility to all critical components: In contrast to the so-called "integral" reactor systems, the steam generator and the control rod drive system are located outside the RV at a level that facilitates easy access, making their preventive maintenance and repair a conveniently executed activity. The steam generator consists of a single loop that includes in some embodiments a preheater, steam generator, and a superheater topped off by a pressurizer. The heat exchangers in the loop, namely the preheater, the steam generator, and the superheater have built-in design features to conveniently access and plug tubes such as appropriate placed manholes that provide access to the heat exchanger tubesheets and/or tube bundles. The decision to deploy the heat exchange equipment outside of the harsh environment of the reactor cavity in the nuclear steam supply system has been informed by the poor reliability of PWR steam generators over the past 3 decades and the colossal costs borne by the industry to replace them.

The RV flange features a reverse joint to minimize its projection beyond the perimeter of the RV cylinder. This design innovation makes it possible to connect the Stack directly to the RV nozzle—gorging to forging connection—eliminating any piping run between them. This design features eliminates the risk of a large pipe break LOCA.

Demineralized water as the reactor coolant: The reactor coolant is demineralized water, which promotes critical safety because of its strong negative reactivity gradient with rise in temperature. Elimination of borated water also simplifies the nuclear steam supply system (NSSS) by eliminating the systems and equipment needed to maintain and control boron levels in the primary coolant. Pure water and a corrosion-resistant primary coolant loop help minimize crud buildup in the RV.

Improved steam cycle reliability: The reliability of the steam cycle is improved by dispensing with the high pressure turbine altogether. Rather, the cycle steam is superheated before it is delivered to the low pressure turbine. The loss in the Rankine efficiency is less than 0.5 percent; the rewards in terms of enhanced reliability and simplification of the power cycle are quite substantial.

Pressure Control: The pressurizer contains a conventional heating/quenching element (water/steam for pressure control). A bank of electric heaters are installed in the pressurizer section which serve to increase the pressure by boiling some of the primary coolant and creating a steam bubble that resides at the top of the pressurizer near the head. A spray column is located near the top head of the pressurizer which sprays water into the steam bubble thereby condensing the steam and reducing the steam bubble. The increase/decrease in size of the steam bubble serves to increase/decrease the pressure of the primary coolant inside the reactor coolant system. In one exemplary embodiment, the primary coolant pressure maintained by the pressurizer may be without limitation about 2,250 psi.

In alternative embodiments, a nitrogen type pressurizer system may be used. In this embodiment, the pressurizer serves to control the pressure in the reactor vessel by the application of controlled nitrogen pressure from external high pressure nitrogen tanks fluidly coupled to the pressurizer. Nitrogen pressure controlled reactors have been used in other reactor types and have years of successful operating experience with a quick response profile.

Preventing fuel failures in the reactor: Over 70 percent of all fuel failures in operation are known to occur from fretting (erosion from repetitive impact) damage, which is the result of "pinging" of the fuel rods by the grid straps. The vibration of the grid straps is directly related to the level of turbulence around the fuel. In the present nuclear steam supply system, the Reynolds number is approximately 20 percent of that in a typical operating PWR today. A lower Reynolds number translates into an enfeebled pinging action (erosion rate varies approximately as 4.8 power of velocity of impact!) on the rods and thus a drastically reduced fretting damage rate. Lower burn-up levels selected for present nuclear steam supply system (in the 45 GWD per MTU range) in comparison to around 60 in the presently operating reactors) will also help ameliorate embrittlement of the fuel cladding and thus prevent rod wastage.

Increased Self-shielding: The gravity-driven circulation of the primary fluid in the present nuclear steam supply system (NSSS) accrues another significant dividend in the form of a dramatically reduced radiation dose emanating from the NSSS. This is because the Nitrogen (N-16) isotope, produced by the neutron bombardment of oxygen in the reactor water in the core, generates high gamma energy emitting N-16 isotope which is largely responsible for the radiation emanating from the Containment. N-16, however, has a half-life of only 7.4 seconds which is less than one-fourth of the time needed for the primary water to travel to the top of the steam generators. Therefore, the quantity of N-16 is attenuated by over 7 half-lives, which means it is in effect depopulated down to minuscule values. Scoping calculations suggest that the radiation dose from the top of the steam generator in the NSSS can be 3 or more orders of magnitude less than that in a pumped-water PWR of a similar size. Thus, it is not necessary to build a thick concrete containment for present NSSS for radiation shielding. In lieu of building and in situ reinforced concrete containment, a shop fabricated steel containment capable of withstanding a crashing airplane is deployed which is more suitable, and more economical.

BRIEF DESCRIPTION OF THE DRAWINGS

The features of the exemplary embodiments of the present invention will be described with reference to the following drawings, where like elements are labeled similarly, and in which:

FIG. 9A is an enlarged detail from FIG. 9;

FIG. 9B is an enlarged detail from FIG. 9;

Figure 1:
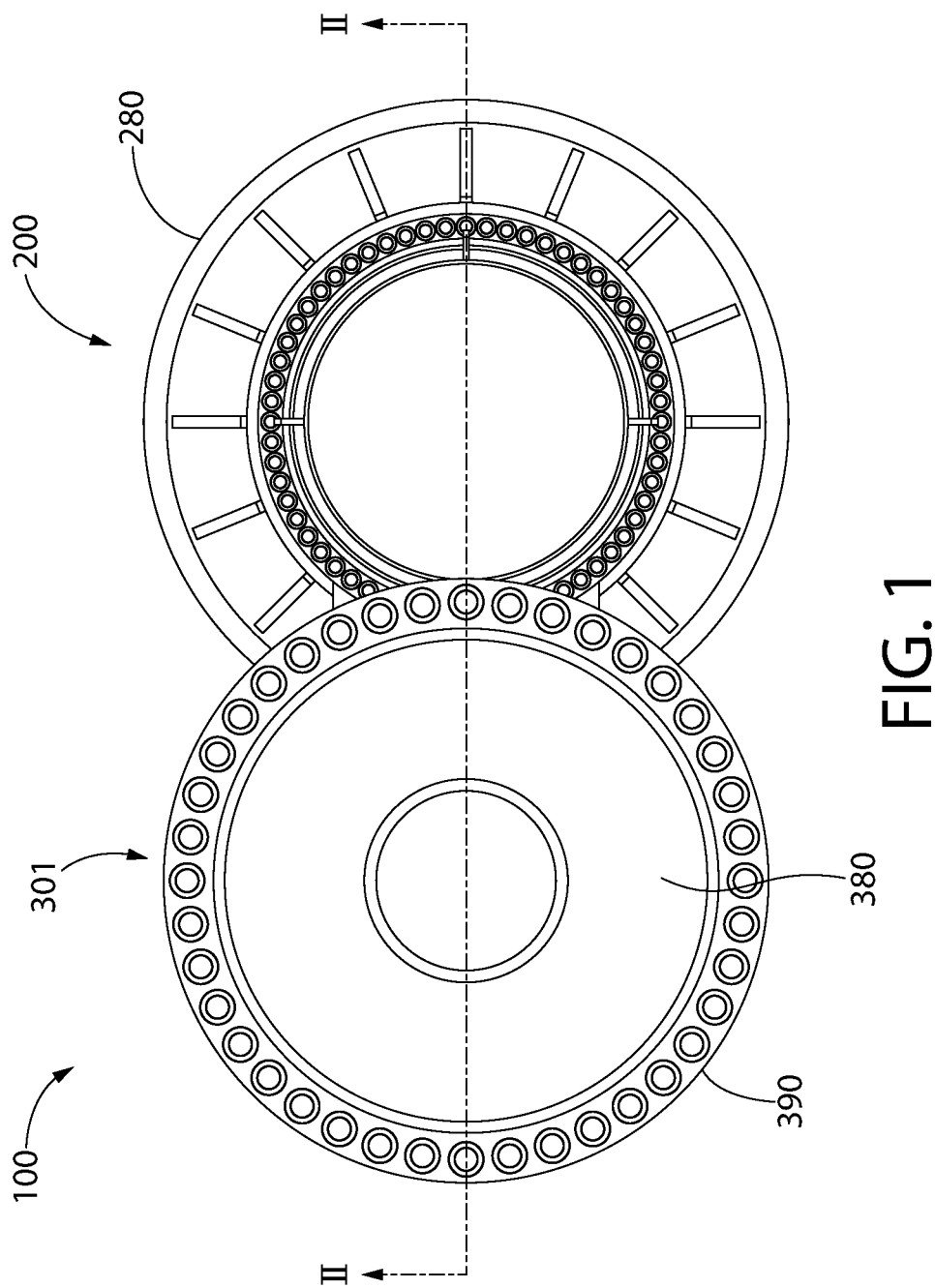
FIG. 1 a top plan view of a nuclear steam supply system including a reactor vessel, pressurizer, and steam generator.

All drawings are schematic and not necessarily to scale.

DETAILED DESCRIPTION OF THE EMBODIMENTS

The features and benefits of the invention are illustrated and described herein by reference to exemplary embodiments. This description of exemplary embodiments is intended to be read in connection with the accompanying drawings, which are to be considered part of the entire written description. The disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

Steam generators used in modern nuclear power plants fall into two categories: Recirculating Type and Once-Thru Type.

Recirculating Type Steam Generators:

The recirculating steam generator is the most commonly used design in the industry. It features a vertical U-bundle with a hemi-head integrally welded to the tubesheet and the primary fluid entering the up flow leg of the U-tubes and exiting through the same hemi-head after flowing down the other leg of the tubes. The hemi-head space is divided into two compartments to separate the "hot" and "cooled" primary streams. The secondary side features a shroud that enables the boiling water to recirculate by the thermo-siphon action. Most world suppliers of operating PWRs, including Westinghouse, Siemens, Combustion Engineering, Framatome, and Mitsubishi utilized the Recirculating type U-bundle steam generators in their PWRs. However, the recirculating type steam generators have suffered from massive tube failures in PWRs around the world well before the end of their design life, forcing utilities to spend billions of dollars in replacement costs. Some plants such as Maine Yankee, Trojan, and Connecticut Yankee have shutdown permanently because of the high cost of steam generator replacement.

Once-Thru Type Steam Generators:

This design employs straight tubes fastened to the tubesheets located at the top and bottom extremities of the tube bundle. The primary water (reactor coolant) and the secondary water (boiler water) flow in a counter-current arrangement with the latter boiling outside the tubes as it extracts heat from the former across the tube walls. The mixture of water and steam in the lower produced in the lower reaches of the tube bundle progressively becomes more dry steam as the secondary flow stream rises inside the steam generator. Babcock & Wilcox was the only reactor supplier who used the once-thru steam generator configuration in its Pressurized Water Reactor (PWR) designs. The disaster at Three Mile Island Unit 2 supplied by B&W in 1979 exposed the flaws of this design.

Figure 2:
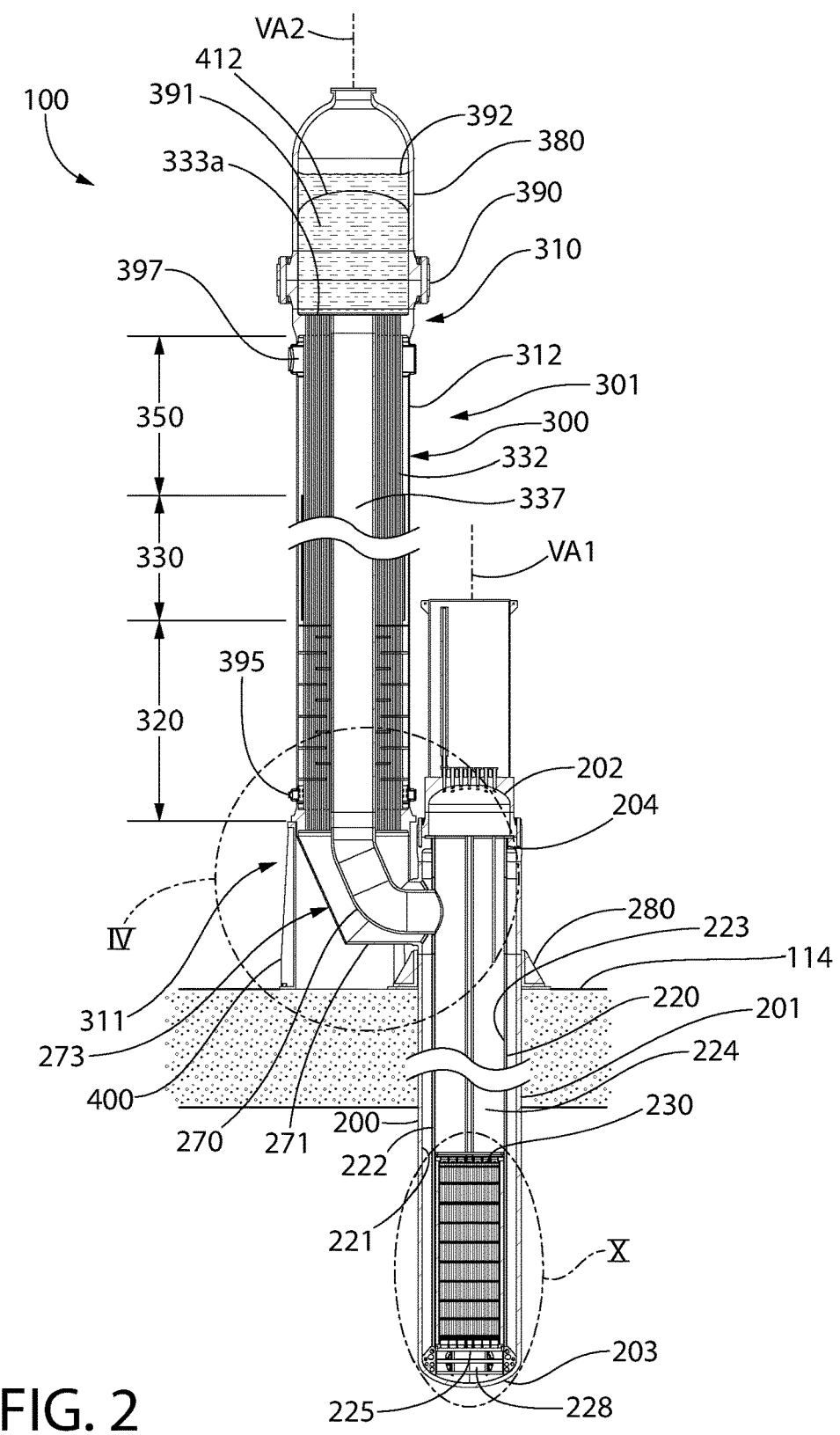
FIG. 2 is side cross-sectional view thereof.

As shown in FIGS. 1 and 2, a nuclear steam supply system 100 (NSSS) of a safe modular underground reactor (SMR) according to the present disclosure comprises a vertical subterranean reactor vessel 200 with the nuclear fuel cartridge (or core) 210 containing the nuclear fuel source standing upright near its bottom. The basic flow or circulation path of the primary coolant or water (i.e. closed primary coolant loop) contained in the reactor vessel through the steam generating vessel 300 and reactor vessel 200 is shown schematically in FIG. 12 and functions as follows. The pressurized reactor primary coolant (at about 2250 psig) is heated by the fission in the core 210, which reduces the coolant density causing it to rise within the tubular reactor shroud 220. The heated reactor coolant (@ about 600 deg. F.) exits the reactor vessel and enters the steam generator 301. Once inside the steam generator, the primary coolant or water flows upward and is delivered to the top distribution plenum 391 by a centrally located tubular riser shell or pipe 337. The primary coolant fluid reverses direction and descends the steam generator flowing inside the bank of tubes (tube side), progressively transmitting its heat energy to the secondary water that flows vertically upwards on the shell side of the steam generator in a countercurrent arrangement to the primary flow stream. The cooled (and thus densified primary stream) re-enters the reactor vessel and flows downward in the annular space between the shroud and reactor vessel walls, reaching the bottom of the fuel core. The primary fluid reverses direction and flows upward resuming its circulation in the primary coolant circuit or loop of the nuclear steam supply system as it is heated by nuclear fission occurring in the reactor. The rate of flow of the primary fluid is set by the balance in the hydrostatic head between its hot up-flowing segment and the cool down-flowing segment (both of which span the reactor vessel and the steam generator) and the hydrodynamic pressure loss governed by what engineers know as the classic Bernoulli's equation. The closed primary coolant flow loop is therefore configured to produce and maintain natural gravity-driven circulation of primary coolant without the assistance of pumps.

As the above summary indicates, the design objectives of the steam generator to fulfill the needs of primary side (i.e. primary coolant side) in one embodiment include:

Provide for the flow of the primary fluid in it with as little friction loss as possible. Reduced pressure loss will increase the rate of circulation and improve the in-tube heat transfer coefficient, which are both salutary effects.

Minimize the lateral distance between the reactor vessel and the steam generator so that the joint between them does not require a pipe (failure of such piping connections from events such as earthquakes, thermal fatigue, and other adverse mechanisms is a matter of safety concern in nuclear plants, which drives the decision to eliminate any large piping in the present SMR).

The secondary side (i.e. secondary coolant side) of the steam generator also has several needs that should be addressed to avoid reliability problems that have afflicted prior designs. The design objectives of the secondary side include:

In recirculating steam generators, the boiling of water in the shell side space has led to the accumulation of aggressive species on the tubesheet surface and in the crevices where the tubes emerge from the tubesheet, which over time, attack the tube walls causing leakage.

The accumulation of solids in the tube support plate crevices has resulted in choking of the tubes in recirculating steam generators.

In recirculating, the steam leaving the steam generator must be stripped of its entrained moisture by mechanical means. The effectiveness of the moisture separator (installed above the tube bundle of the steam generator) has been a source of operation problems in PWRs.

The once-through steam generators suffered from the demerit of having too little water inventory in the shell side space. In case of an interruption in the in-flow from the feedwater (secondary coolant) line, the steam generator would tend to go dry in a very short time, making it a safety risk. This risk actually materialized at Three Mile Island nuclear generating plant in April 1979.

The above deficiencies in the present day steam generator designs have guided the development of a new design disclosed herein. While the novel design features of the new present embodiment of a steam generator can be used in any steam producing boiler (i.e. non-nuclear), its anatomy and features are explained in the context of a nuclear SMR.

Referring initially to FIGS. 1-6, a steam supply system 100 for a nuclear pressurized water reactor (PWR) according to the present disclosure is shown. From the thermal-hydraulic standpoint, the system includes reactor vessel 200 and steam generator 301 fluidly coupled thereto. The steam generating vessel 300 and reactor vessel 200 are vertically elongated and separate components which hydraulically and physically are closely coupled, but discrete vessels in themselves that are thermally isolated except for the exchange of primary loop coolant (i.e. reactor coolant) flowing between the vessels. The steam generating vessel 300 is laterally adjacent to, but vertically offset from the reactor vessel 200 to provide access to the reactor vessel internal components and control rods.

As further described herein, the steam generating vessel 300 in one embodiment includes three heat transfer zones comprising (from bottom to top) a preheater section 320, main steam generator section 330, and a superheater section 350 which converts a fluid such as water flowing in a secondary coolant loop from a liquid entering the steam generating vessel 300 at feedwater inlet 301 to superheated steam leaving the steam generating vessel at steam outlet 302. The secondary coolant loop water may be a Rankine cycle fluid used to drive a turbine-generator set for producing electric power in some embodiments. Other uses of the steam are possible. The assemblage of the foregoing three heat exchangers may be referred to as a "stack."

Pressurizer 380 maintains a predetermined pressure of the primary coolant fluid. The pressurizer is an all-welded pressure vessel mounted atop the steam generating vessel 300 and engineered to maintain a liquid/gas interface (i.e. primary coolant water/inert gas) that operates to enable control of the primary coolant pressure in the steam generator. Pressurizer 380 may be mounted directly on top of the steam generating vessel 300 above the top tubesheet 333a and hydraulically seals the vessel at the top end. The pressurizer 380 is in fluid communication with the top tubesheet 333a and primary coolant pooling above the tubesheet in the top distribution plenum 391. The top head of the pressurizer 390 may have a hemispherical or an ellipsoidal profile in cross section.

The pressurizer 380 is an all-welded pressure vessel with an open flange at its bottom, a curved "false bottom" plate, and a combination of conical and cylindrical shell courses and a top head in the form of a surface of revolution.

In one embodiment, as shown, pressurizer 380 has an open flange at its bottom and is removably mounted to the steam generating vessel 300 via a bolted and flanged connection 390 to provide access to the top tubesheet 333a for maintenance, inspection, and/or repair of the tubes (e.g. plugging tubes, checking tubesheet-to-tube joints, etc.). The pressurizer 380 in some embodiments includes a convexly curved false bottom plate 412 that separates the turbulated primary flow underneath it in the top distribution plenum 391 from the water mass in pressurizer space keeping the latter relatively quiescent (see, e.g. FIG. 2). Suitably located small holes or perforations in the false bottom plate 412 provide for fluid communication between the water inventories in the two spaces.

Figure 11:
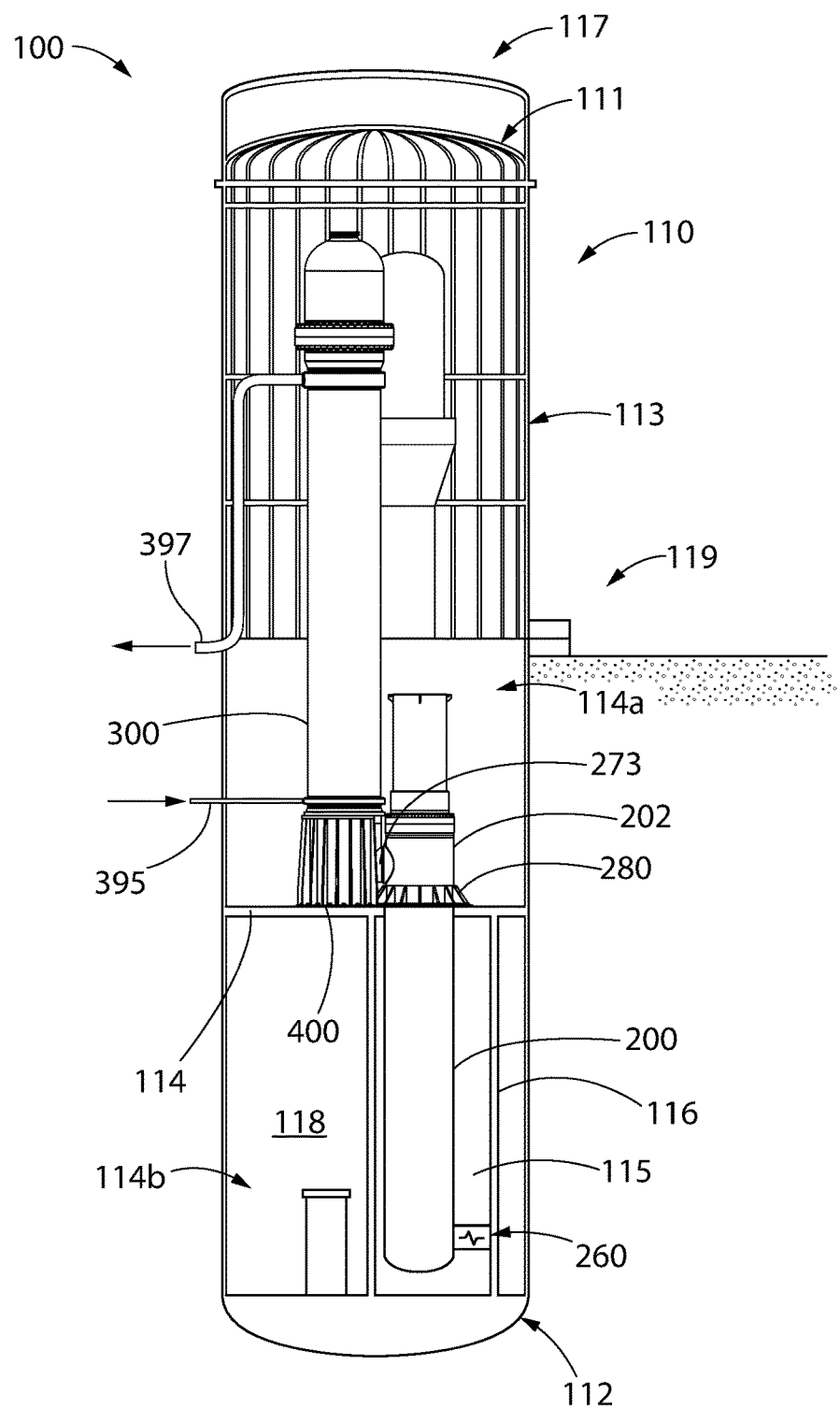
FIG. 11 is cross section of a containment vessel including a nuclear steam supply system according to the present disclosure which includes the steam generator assembly comprising the reactor vessel and steam generating vessel.

Referring to FIG. 11, reactor vessel 200 and steam generating vessel 300 may be housed in a containment vessel 110. Containment vessel 110 may be formed of a suitable shop-fabricated steel comprised of a top 111, bottom 112, and cylindrical sidewall 113 extending therebetween. In some embodiments, portions of the containment vessel which may be located above ground level may be made of ductile ribbed steel to help withstand aircraft impact. A missile shield 117 which is spaced above the top 111 of the containment vessel 110 may be provided as part of the containment vessel or a separate containment enclosure structure (not shown) which encloses the containment vessel 110. A horizontal partition wall 114 divides the containment vessel into an upper portion 114a and a lower portion 114b. Partition wall 114 defines a floor in the containment vessel. In one embodiment, a majority of reactor vessel 200 may be disposed in lower portion 114b and steam generating vessel 300 may be disposed in upper portion 114a as shown. Partition wall 114 may be formed of any suitable material, including without limitation for example concrete or metal.

In various embodiments, the containment vessel 110 may be mounted above ground, partially below ground, or completely below ground. In certain embodiments, the containment vessel 110 may be positioned so that at least part or all of lower portion 114b that contains the nuclear fuel reactor core (i.e. fuel cartridge 230) is located below ground level. In one embodiment, the entire reactor vessel 200 and a portion of the steam generating vessel 300 are located entirely below ground level for maximum security. The cylindrical shell or sidewall 113 of containment vessel 110 may be horizontally split into an upper section and lower section which are joined together by a circumferential welded or bolted flanged joint 119 as shown in FIG. 11 to provide a demarcation for portions of the containment vessel which are located essentially above and below ground level. In other embodiments, the upper and lower sections may be welded together without use of a flange.

In one embodiment, for example without limitation, the containment vessel 110 may have a representative height of approximately 200 feet or more for a 160 MW (megawatt) modular nuclear electric generation facility. A non-limiting representative diameter for this power generation facility is about 45 feet. Any suitable height and diameter for the containment vessel may be provided depending on system component configuration and dimensions.

Containment vessel 110 further includes a wet reactor well 115 defined in one embodiment by a cylindrical circumscribing walled enclosure 116 which is flooded with water to provide enhanced radiation shielding and a back-up reserve of readily accessible coolant for the reactor core. In one embodiment, the walled enclosure 116 may be formed of stainless steel cylindrical walls which extend circumferentially around the reactor vessel 200 as shown. Other suitable materials may be used to construct enclosure 116. The wet reactor well 115 is disposed in the lower portion 114b of the containment vessel 110. Lower portion 114b may further include a flooded (i.e. water) used fuel pool 118 adjacent to the enclosure 116. In one embodiment, both the used fuel pool 118 and walled enclosure 116 are disposed below horizontal partition wall 114 as shown in FIG. 1.

Both the reactor vessel 200 and steam generating vessel 300 preferably may be vertically oriented as shown to reduce the footprint and diameter of the containment vessel 110. The containment vessel 110 has a diameter large enough to house both the reactor vessel, steam generating vessel, and any other appurtenances. The containment vessel 110 preferably has a height large enough to completely house the reactor vessel and steam generating vessel to provide a fully contained steam generator with exception of the water and steam inlet and outlet penetrations for second coolant loop fluid flow associated with the Rankine cycle for driving the turbine-generator set for producing electric power.

Figure 12:
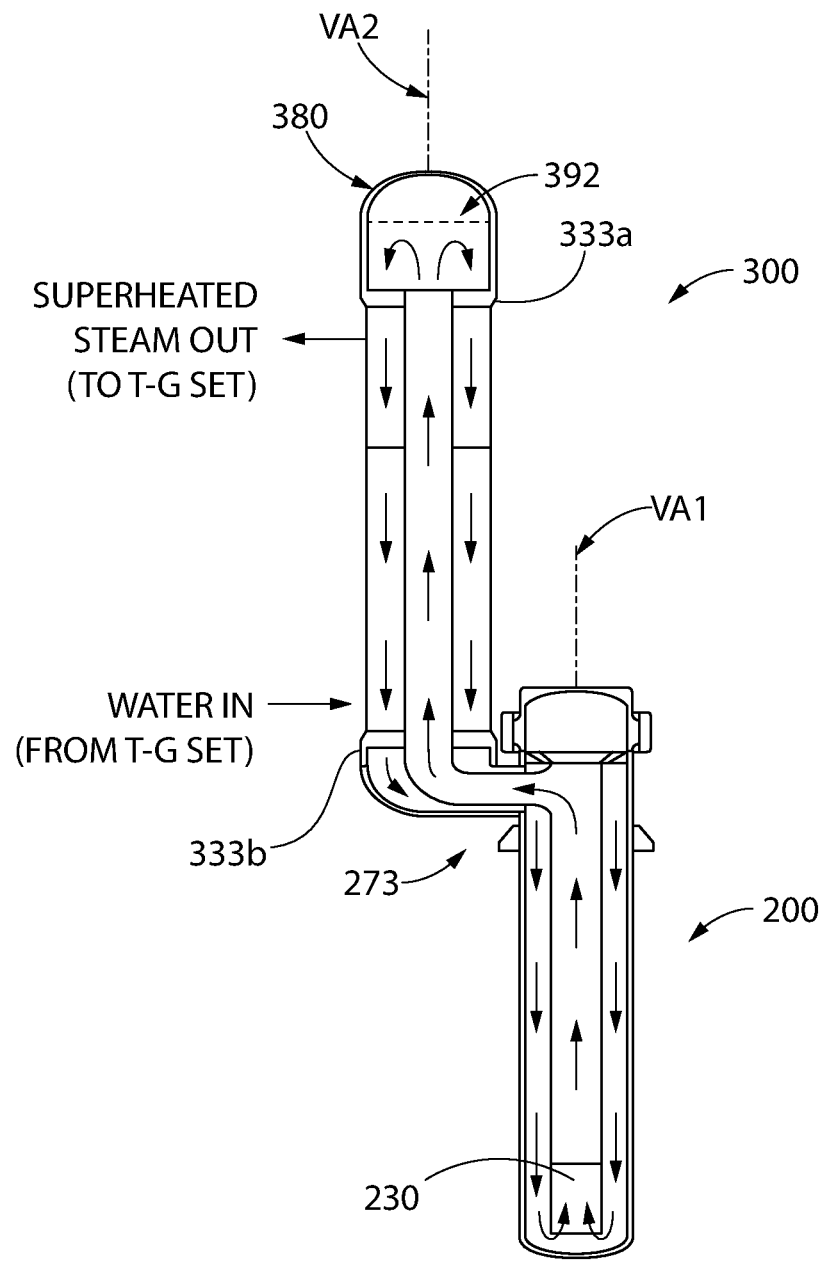
FIG. 12 is a schematic flow diagram of the nuclear steam supply system of FIG. 2 showing the closed flow path or circulation flow loop of primary coolant represented by the directional flow arrows.

FIG. 12 shows the circulation path of primary coolant (e.g. water) in the primary coolant flow loop (see directional arrows). In one embodiment, the primary coolant flow is gravity-driven relying on the change in temperature and corresponding density of the coolant as it is heated in the reactor vessel 200, and then cooled in the steam generating vessel 300 as heat is transferred to the secondary coolant loop of the Rankine cycle which drives the turbine-generator (T-G) set. The pressure head created by the changing different densities of the coolant (i.e. hot—lower density and cold—higher density) induces flow or circulation through the reactor vessel-steam generating vessel system as shown by the directional flow arrows. Advantageously, the gravity-driven primary coolant circulation requires no coolant pumps or machinery thereby resulting in cost (capital, operating, and maintenance) savings, reduced system power consumption thereby increasing energy conversion efficiency of the PWR system, in addition to other advantages as described herein.

Reactor Vessel

Reactor vessel 200 may be similar to the reactor vessel with gravity-driven circulation system disclosed in commonly-owned U.S. patent application Ser. No. 13/577,163 filed Aug. 3, 2012, which is incorporated herein by reference in its entirety.

Figure 3:
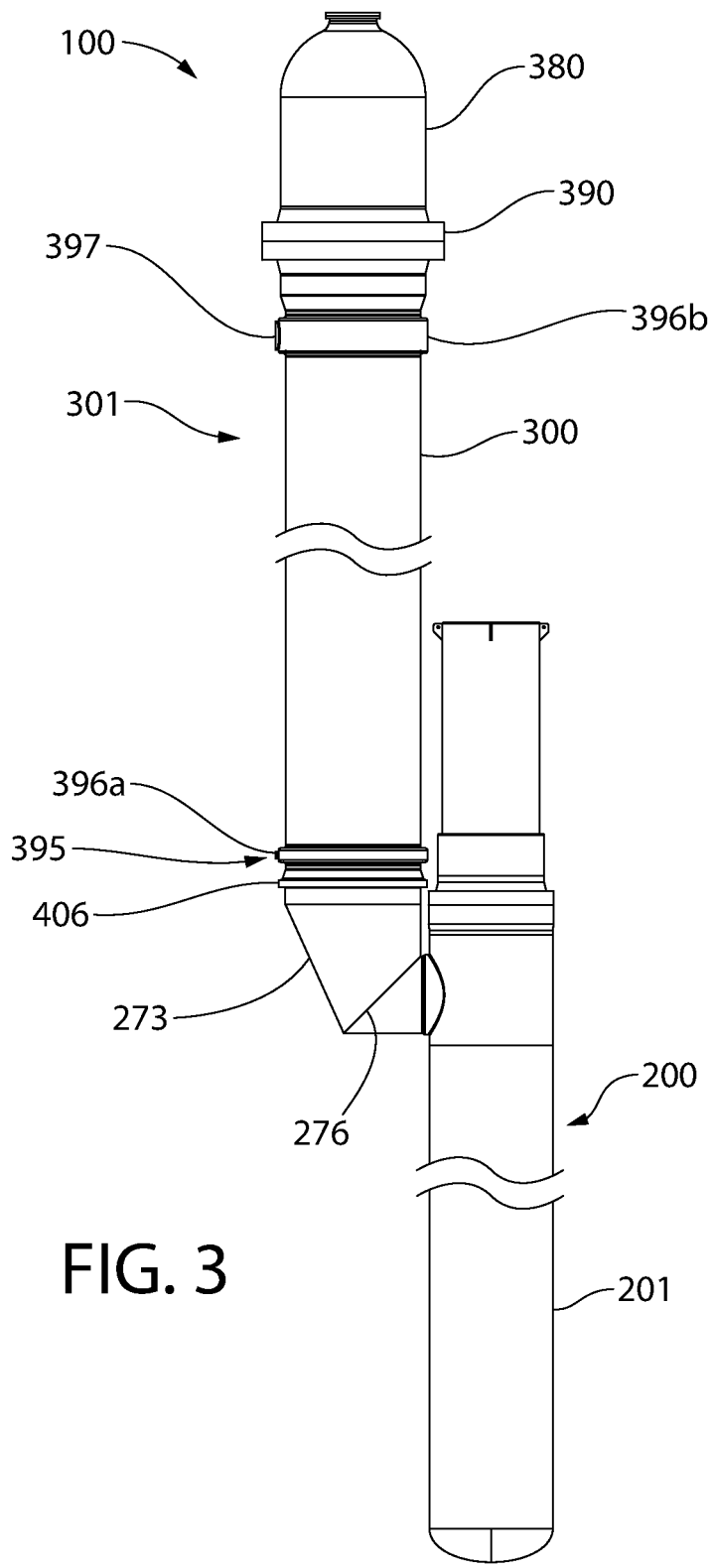
FIG. 3 is a side elevation view thereof; n elevation cross-sectional view of the reactor vessel of FIG. 1.

Referring to FIGS. 1-3, reactor vessel 200 in one non-limiting embodiment is an ASME code Section III, Class 1 thick-walled cylindrical pressure vessel comprised of a cylindrical sidewall shell 201 with an integrally welded hemispherical bottom head 203 and a removable hemispherical top head 202. Shell 201 defines an internal cavity 208 configured for holding the reactor core, reactor shroud, and other appurtenances as described herein. In one embodiment, the upper extremity of the reactor vessel shell 201 may be equipped with a slightly tapered hub flange 204 (also known as "welding neck" flange in the art) which is bolted to a similar mating flange 205 welded to the top head 202. The bolted connection of the top head 202 provides ready access to the reactor vessel internals such as the reactor core.

Two concentric self-energizing gaskets 206 compressed between the two mating flanges 204, 205 provide leak tightness of the reactor vessel 200 at the connection between the top head 202 and shell 201. The leak tightness under operating conditions is assured by an axisymmetric heating of the flanged joint that is provided by the fluid flow arrangement of the primary coolant in the system, as further described herein. The top head 202 may contain vertical penetrations 207 for insertion of the control rods and further may serve as a base for mounting the associated control rod drives, both of which are not depicted but well known in the art without further elaboration.

With continuing reference to FIGS. 1-3, the reactor vessel 200 includes a tubular cylindrical reactor shroud 220 which contains the reactor core defined by fuel cartridge 230.

Reactor shroud 220 transversely divides the shell portion of the reactor vessel into two concentrically arranged spaces: (1) an outer annulus 221 defining an annular downcomer 222 for primary coolant entering the reactor vessel which is formed between the outer surface of the reactor shroud and the inner surface of the shell 201; and (2) an inner passageway 223 defining a riser column 224 for the primary coolant leaving the reactor vessel heated by fission in the reactor core. The reactor shroud 220 is elongated and extends in an axial direction along vertical axis VA1 of the reactor vessel which defines a height and includes an open bottom 225 and top 226. In one embodiment, the bottom 225 of reactor shroud 220 is vertically spaced apart by a distance from the bottom head 203 of reactor vessel 200 and defines a bottom flow plenum 228. Bottom flow plenum 228 collects primary coolant from annular downcomer 222 and directs the coolant flow into the inlet of the riser column 224 formed by the open bottom 225 of reactor shroud 220 (see, e.g. FIG. 2). On the opposite top end, the top hub flange 204 of reactor vessel 200 ensures that the hot primary coolant water exiting the reactor vessel through outlet nozzle 271 cannot flow back into the downcomer 222 and mix with the incoming cooled primary coolant from the steam generator 301.

Figure 10:
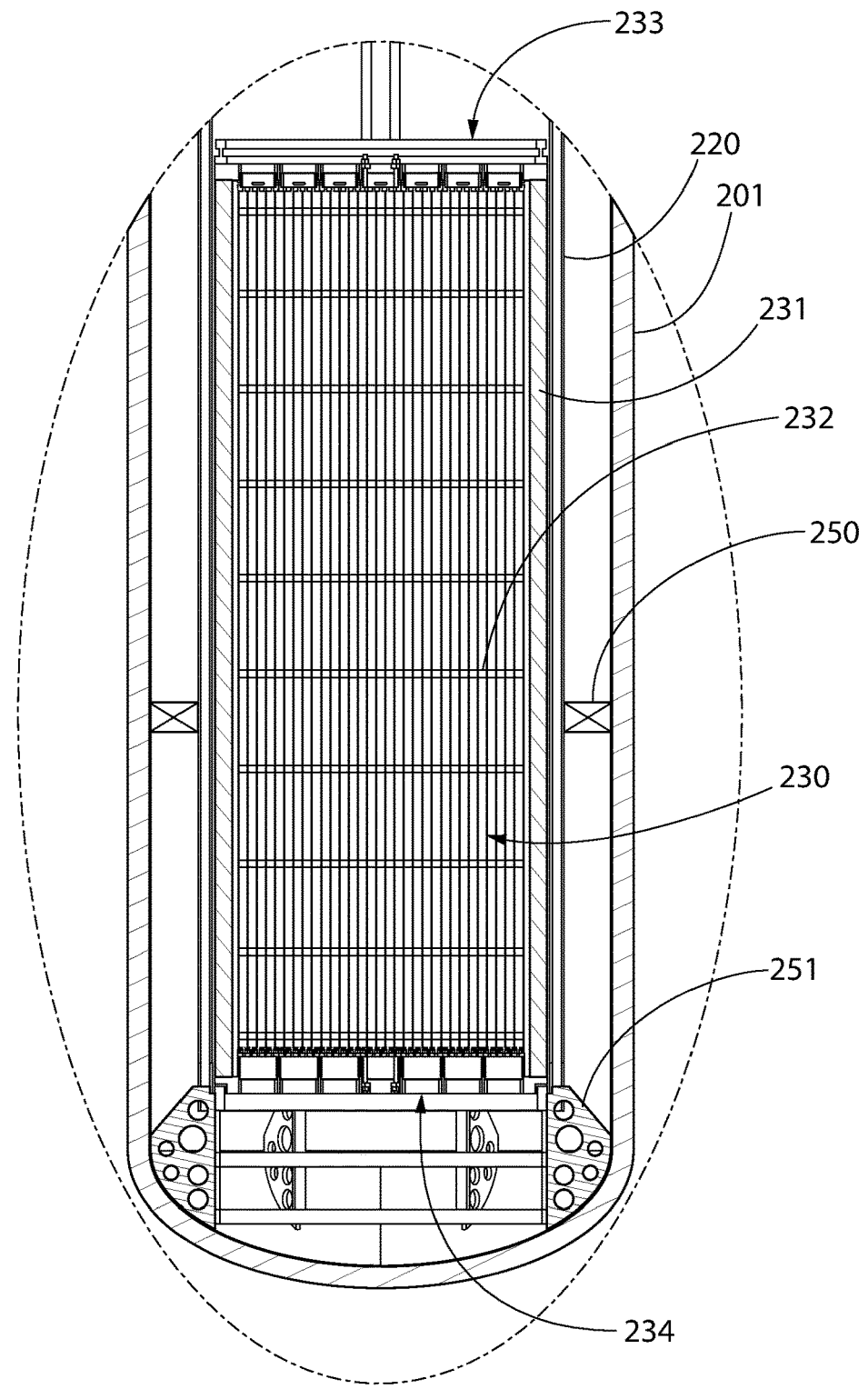
FIG. 10 is an enlarged detail from FIG. 2 showing the bottom of the reactor vessel and fuel core.

Both the fuel cartridge 230 and reactor shroud 220 are supported by a core support structure ("CSS"), which in one embodiment includes a plurality of lateral support members 250 that span between and are attached to the reactor shroud and the shell 201 of the reactor vessel 200. Two support members 250 are shown in FIG. 10 for brevity. A suitable number of supports members spaced both circumferentially and vertically apart are provided as needed to support the combined weight of the fuel cartridge 230 and reactor shroud 220. In one embodiment, the bottom of the reactor shroud 220 is not directly attached to the reactor vessel 200 to allow the shroud to grow thermally in a vertical axial direction (i.e. parallel to vertical axis VA1) without undue constraint. A plurality of circumferentially spaced apart flow baffles 251 may be attached to the bottom of shroud 220 which further support the dead weight of the shroud. Baffles 251 are vertically oriented and have a shape configured to complement the curvature of the hemispherical bottom head 203 of the reactor vessel 200 as shown (see, e.g. FIG. 10) on which the baffles are seated. A plurality of lateral perforations 252 may be provided in the baffles 251 to aid in mixing the cooled primary coolant flow descending in the downcomer 222 before rising to enter the fuel cartridge 230.

The reactor shroud 220 may be a single-walled open cylinder in one embodiment as shown. In an alternative construction, shroud 220 may be a double-walled cylinder comprising two radially spaced apart single shells with a sealed air gap or insulating material therebetween. This double-wall construction of reactor shroud 220 forms an insulated structure designed to retard the flow of heat across it and forms a smooth vertical riser column 224 for upward flow of the primary coolant (i.e. water) heated by the fission in the fuel cartridge 230 ("core"), which is preferably located at the bottom extremity and inside passageway 224 of the shroud in one embodiment as shown in FIGS. 1-3. The reactor shroud 220 is laterally supported by the reactor vessel by the lateral support members 250 to prevent damage from mechanical flow-induced vibrations resulting in metal fatigue over a period of time. Shroud 220 and other wetted parts of reactor vessel 200 may be made of a corrosion resistant material, such as without limitation stainless steel. Other materials and/or corrosion resistant coatings may be used.

Referring to FIGS. 2 and 10, fuel cartridge 230 in one embodiment is a unitary autonomous structure containing upright fuel assemblies, and is situated in a region of the reactor vessel 200 that is spaced above bottom head 203 so that a relatively deep plenum of water lies underneath the fuel cartridge. Fuel cartridge 230 may be located inside reactor shroud 230 at the bottom end of the shroud as shown. The fuel cartridge 230 is insulated by reactor shroud 220 so that a majority of the heat generated by the fission reaction in the nuclear fuel core is used in heating the primary coolant flowing through the fuel cartridge and adjoining upper portions of the riser column 224. Fuel cartridge 230 is an open cylindrical structure including cylindrically shaped sidewalls 231, open top 233, and open bottom 234 to allow the primary coolant to flow upward completely through the cartridge (see directional flow arrows). In one embodiment, the sidewalls 231 may be formed by multiple arcuate segments of reflectors which are joined together by suitable means. The open interior of the fuel cartridge 230 is filled with a support grid 232 for holding the nuclear fuel rods and for insertion of control rods into the core to control the fission reaction as needed.

Briefly, in operation, the hot reactor primary coolant exits the reactor vessel 200 through a low flow resistance outlet nozzle 270 to be cooled in the adjacent steam generating vessel 300 (see, e.g. FIGS. 2, 3, and 12). The cooled reactor primary coolant leaves the steam generating vessel 300 and enters the reactor vessel 200 through the inlet nozzle 271. The internal plumbing and arrangement in the reactor vessel directs the cooled reactor coolant down through to the annular downcomer 222. The height of the reactor vessel 200 is preferably selected to support an adequate level of turbulence in the recirculating reactor primary coolant by virtue of the density differences in the hot and cold water columns which is commonly known as the thermo-siphon action (density difference driven flow) actuated by gravity. In one embodiment, the circulation of the reactor primary coolant is driven by over 8 psi pressure generated by the thermo-siphon action, which has been determined to ensure (with adequate margin) a thoroughly turbulent flow and stable hydraulic performance.

Figure 4:
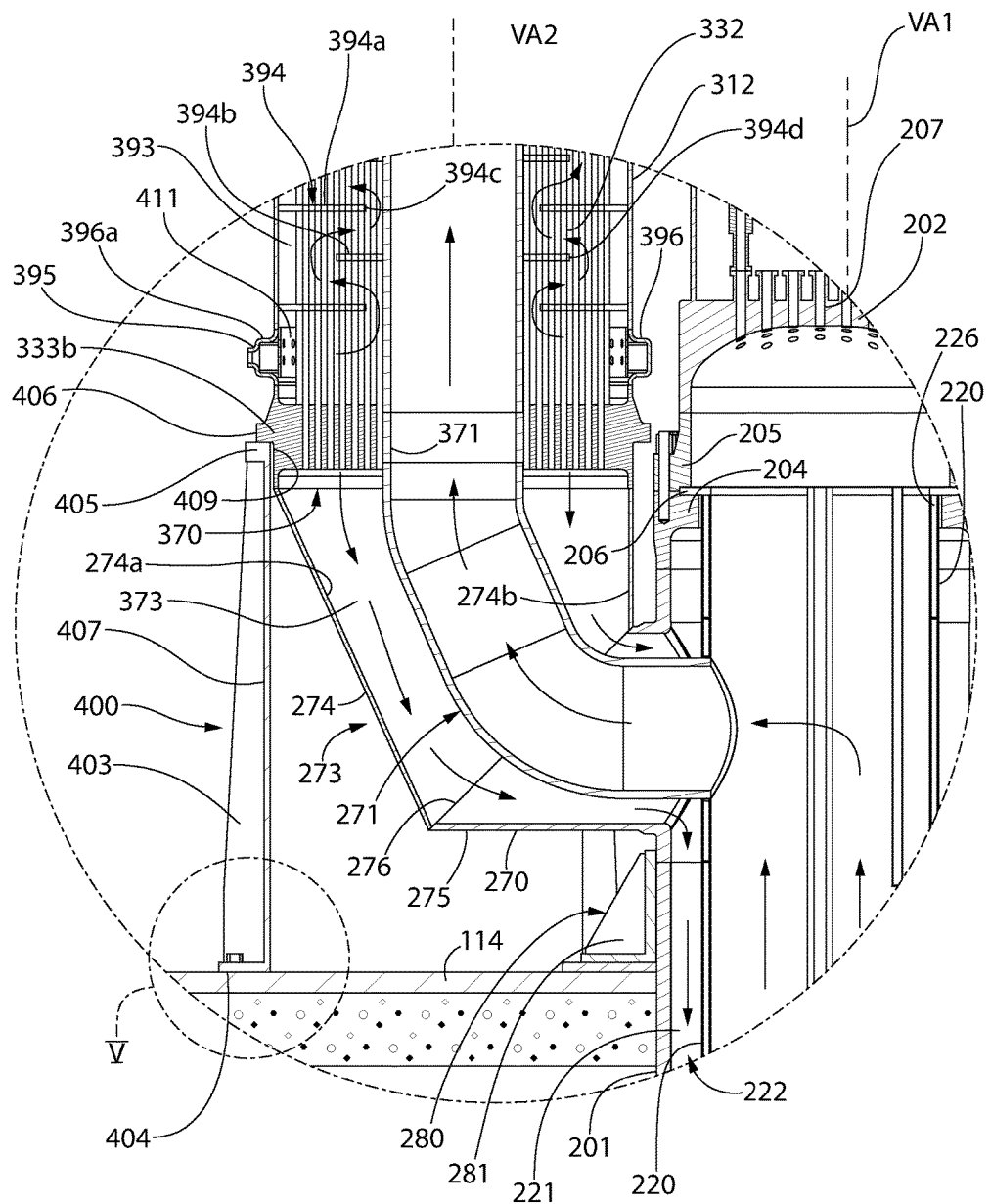
FIG. 4 is an enlarged detail from FIG. 2.

Referring to FIGS. 2 and 4, the top of the reactor vessel shell 201 is welded to a massive upper support forging which may be referred to as a reactor support flange 280. Support flange 280 supports the weight of the reactor vessel 200 and internal components above the wet reactor well 115. In one embodiment, the support flange is structurally stiffened and reinforced by a plurality of lugs 281 which are spaced circumferentially apart around the reactor vessel and welded to both the reactor vessel and flange, as shown. Support flange 280 contacts and engages horizontal partition wall 114 which transfers the dead weight of the reactor vessel 200 to the containment vessel 110. The reactor vessel's radial and axial thermal expansion (i.e. a majority of growth being primarily downwards from horizontal partition wall 114) as the reactor heats up during operation is unconstrained. However, the portion of containment vessel 110 which projects above partition wall 114 is free to grow upwards in unison with the upwards growth of the steam generating vessel 30 to minimize axial differential expansion between the steam generating vessel and reactor vessel. Because the reactor vessel and steam generating vessel are configured and structured to thermally grow in height at substantially the same rate when heated, this arrangement helps minimize potential thermal expansions stress in the primary coolant fluid coupling 273 between the reactor vessel and steam generating vessel.

The support flange 280 is spaced vertically downwards on reactor vessel shell 201 by a distance from top head 202 of reactor vessel 200 sufficient to allow a fluid connection to be made to the steam generating vessel 300 which is above partition wall 114, as shown in FIGS. 2 and 11. When the reactor vessel 200 is mounted inside containment vessel 110, top head 202 of the reactor vessel and the primary coolant fluid coupling 273 (collectively formed by combined inlet-outlet flow nozzle 270/271) are located above reactor well 115. This provides a location for connection to the steam generator plenums and for the engineered safety systems (e.g. control rods, etc.) to deal with various postulated accident scenarios. A majority of the reactor vessel shell 201, however, may be disposed below partition wall 114 and immersed in the wet reactor well 115 as shown in FIG. 11.

The bottom region of the reactor vessel 200 is restrained by a lateral seismic restraint system which may be comprised of a plurality of circumferentially and vertically spaced apart lateral restraint members 260 (one of which is shown schematically in FIG. 11 for brevity). Restraint members 260 span the space between the reactor shell 201 and the reactor well 115 inside surface of the cylindrical enclosure 116 to withstand seismic events. The seismic restraint design is configured to allow for free axial (i.e. longitudinal along vertical axis VA1) and diametrical thermal expansion of the reactor vessel 200. The reactor well 115 is flooded during power operations to provide defense-in-depth against a (hypothetical, non-mechanistic) accident that is assumed to produce a rapid rise in the enthalpy of the reactor's contents. Because the reactor is designed to prevent loss of core water by leaks or breaks and the reactor well is flooded, burn-through of the reactor vessel by molten fuel (corium) is not likely.

Referring to FIGS. 2-4, the reactor vessel combined inlet-outlet flow nozzle 270/271 (primary coolant fluid coupling 273) is comprised of two concentric flow conduits including an outer inlet nozzle 270 and inner outlet nozzle 271. The outlet nozzle 271 has one end welded to the reactor shroud 220 (internal to the reactor vessel shell 201) and an opposite end welded to the inlet nozzle 371 of the steam generating vessel 300 (at the bottom of riser pipe 337). The reactor vessel inlet nozzle 270 has one end welded to the reactor vessel shell 201 and an opposite end welded to steam generator outlet nozzle 370 defined at least in part by the bottom tubesheet 333b of the steam generating vessel 300. Accordingly, reactor vessel inlet nozzle 270 is essentially welded to the perimeter of bottom tubesheet 333b of the steam generator 301 (best shown in FIG. 4).

It should be noted that the inlet nozzle 371 of the steam generating vessel 300 and riser pipe 337 are contiguous in structure. The inlet nozzle 371 is further contiguous with the outlet nozzle 271 of the reactor vessel. Accordingly, the riser pipe 337 may also be viewed from one perspective as physically extending and fluidly connected directly to the internal shroud 220 of the reactor vessel as a single flow conduit in lieu of three separate flow conduit sections. In one embodiment, therefore, the riser pipe 337 may have a constant diameter including portions which are considered to form the primary coolant inlet nozzle 371 and reactor vessel outlet nozzle 271.

An annular bottom collection plenum 373 is formed between the inlet and outlet nozzles 270, 271 of primary coolant fluid coupling 273 below the bottom tubesheet 333b (see, e.g. FIG. 4). Collection plenum 373 serves to collect the cooled primary coolant exiting the bottom ends of the tubes 332 through the bottom tubesheet 333b which flows back to the reactor vessel 200 through inlet nozzle 270 into the annular downcomer 222.

In the present embodiment, the outlet nozzle 271 of the reactor vessel and inlet nozzle 371 of the steam generating vessel each have a smaller diameter than the inlet nozzle 270 of the reactor vessel and outlet nozzle 370 of the steam generating vessel. The combined inlet-outlet flow nozzle 270/271 is located above partition wall 114 of the containment vessel 110. The inlet nozzle 371 and outlet nozzle 370 of the steam generating vessel 300 collectively define a mating concentrically arranged combined primary coolant inlet/outlet nozzle 371/370 for the steam generating vessel.

In one embodiment, the inlet flow nozzle 270 and outlet flow nozzle 271 of the reactor vessel 200 are configured as 90 degree flow conduits or elbows as shown. This allows extremely close horizontal spacing of the reactor vessel and steam generator shells due to the closely coupled primary coolant combined inlet-outlet flow nozzle 270/271 to the steam generator, thereby eliminating a straight horizontal section of piping between the reactor vessel and steam generator. Advantageously, such close coupling of the reactor vessel 200 and steam generator vessel 300 avoids need for long loops of large piping in the reactor primary coolant which creates the potential for a "large break" Loss of Coolant Accident (LOCA) event.

Close coupling of the reactor vessel 200 and steam generating vessel 300 are achieved by the minimal radial projection of the combined inlet-outlet flow nozzle 270/271 beyond the reactor vessel shell. The total horizontal length of the inlet/outlet nozzle connection between the reactor vessel 200 and steam generating vessel 300 in certain embodiment is less than or equal to the diameter of the reactor vessel 200, and/or the steam generating vessel 300 to eliminate long runs of large coolant piping between the reactor and steam generating vessels. Concomitantly, the vertical centerline VA2 of the steam generating vessel 300 may be less than two steam generator diameters apart horizontally from the vertical centerline VA1 of the reactor vessel 200 in some embodiments.

To achieve the closest possible coupling of the reactor vessel 200 and steam generating vessel 300, the outer reactor vessel inlet nozzle 270 of the primary coolant fluid coupling 273 may be a mitered 90 degree elbow or bend comprising an eccentric cone section 274 joined to a short horizontal stub pipe section 275 using a miter joint 276 (best shown in FIG. 4). The miter joint 276 minimizes the lateral distance between the reactor vessel 200 and steam generating vessel 300. Miter joint 276 is disposed an angle between 0 and 90 degrees (e.g. about 30-60 degrees in some embodiments) with respect to the horizontal plane at the joint. The stub pipe section 275 is disposed at a 90 degree angle to the eccentric cone section 274. The outer reactor vessel inlet nozzle 270 therefore forms an asymmetrically-shaped outer flow jacket which surrounds the inner reactor vessel outlet nozzle 271 as shown.

The eccentric cone section 274 has a circular cross section and inside diameter which varies (i.e. narrows) from its inlet end at steam generator outlet nozzle 370 adjacent bottom tubesheet 333b to the stub pipe section 275. Cone section 274 is formed by a straight inner sidewall 274b and an opposing inclined sidewall 274a which is angled with respect to the inner sidewall as shown in FIG. 4. The outlet end of the eccentric cone section at the miter joint 276 has a circular cross section as does the inlet to the stub pipe section 275 which is coupled to the reactor vessel wall 201 (e.g. welded).

Steam Generator

The steam generator 301 will now be described in further detail. Referring to FIGS. 1-9, the steam generating vessel 300 in one embodiment may a vertically oriented and elongated structure which defines a vertical axis VA2. In one embodiment, the vertical axis VA2 of the steam generating vessel is horizontally offset from the vertical axis VA2 of the reactor vessel 200 so that the steam generating vessel is arranged laterally adjacent to the reactor vessel. In one embodiment, the steam generating vessel 300 has a height which is at least as high as the height of the reactor vessel 200 to achieve the thermo-hydraulic conditions necessary to induce gravity-driven primary coolant circulation through the steam generating vessel 300 and reactor vessel 200.

Structurally, steam generating vessel 300 includes a top 310, bottom 311, and a vertically extending hollow cylindrical shell 312 extending therebetween which defines an internal cavity 393 for holding a plurality of heat exchange components. Steam generating vessel 300 further includes a top tubesheet 333a, bottom tubesheet 333b, a plurality of heat transfer tubes 332 extending vertically between the tubesheets, an internal riser pipe 337, and pressurizer 380 disposed on the top 310 of the vessel. The top and bottom tubesheets 333a, 333b are circular in top plan view and of suitable thickness to withstand the operating pressure within the steam generating vessel 300 without undue deformation which could adversely affect the integrity of the joints between the tubes 332 and tubesheets. In one embodiment, the bottom tubesheet 333b may have a convexly rounded top so that any debris accumulating within the steam generating vessel 300 settles to the outside perimeter of the tubesheet inside the shell 312. The tubesheets are preferably formed a thick corrosion resistant steel such as stainless steel in one embodiment.

In one embodiment, riser pipe 337 is concentrically aligned with shell 312 and lies on the vertical axis VA2 of the vessel. The tubes 332 are circumferentially arranged around the outside of the riser pipe 337 in any suitable pattern between the riser pipe and shell 312 of steam generating vessel 300.

In one embodiment, the tubes 332 of the steam generating vessel 300 may define three heat transfer zones arranged vertically for converting secondary coolant feedwater entering the bottom of the vessel from a liquid phase to a steam phase exiting the top of the vessel. In one embodiment, the steam phase is superheated steam. The three heat transfer zones may include (from bottom up) a preheater section 320 for initial heating of the liquid secondary coolant, main steam generator section 330 which serves as the boiler for heating the secondary coolant to the boiling point temperature where it changes phase to steam, and superheater section 350 for heating the steam to superheated conditions. In certain arrangements and configurations of the steam generator 300, the preheater 320 may be omitted depending on the thermo-hydraulic design of the system.

The preheater section 320, steam generator section 330, and superheater section 350 are tubular heat exchangers each including a plurality of parallel straight tubes 332 (i.e. tube bundles) with the top and bottom tubesheets 333a, 333b disposed at the uppermost and lowermost extremities or ends of each tube 332. In one embodiment, the tube bundles are contiguous in structure from top to bottom so that there are no intermediate structures formed between the three different heat transfer sections on the tubeside. Primary coolant therefore flows downwards through each of the tubes 332 which have a continuous structure and height from the top tubesheet 333a to bottom tubesheet 333b. The preheater section 320, steam generator section 330, and superheater section 350 therefore are defined by the phase of the secondary coolant within the three different heat transfer zones as the feedwater changes phase from a liquid state entering the steam generating vessel 300 at the bottom to steam exiting from the top of the vessel. The internal cavity 393 of the steam generating vessel 300 may be contiguous and open between the tubesheets 333a and 333b on the shell side of the steam generating vessel 300 without any intermediate structures which may interrupt the upward flow of secondary coolant.

Figure 5:
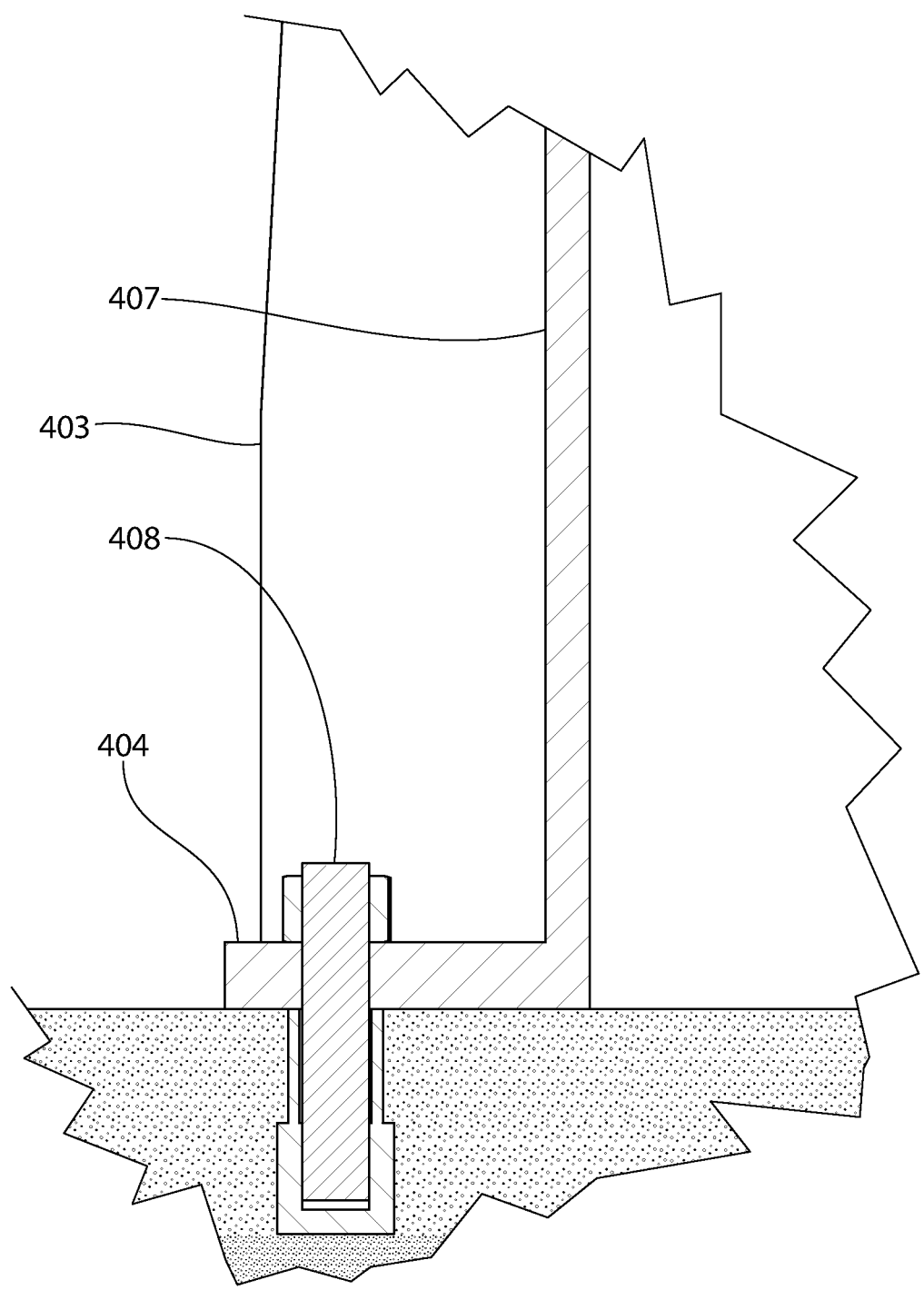
FIG. 5 is an enlarged detail from FIG. 4.

The preheater 320, steam generator 330, and superheater 350 are configured to form a parallel counter-flow type heat exchanger arrangement in which the secondary coolant (Rankine cycle) flows in an opposite, but parallel direction to the reactor primary coolant (see, e.g. FIGS. 4, 5, and 9B).

In a certain embodiment, the preheater section 320 may be configured to provide a combination of parallel counter-flow and cross-flow of the secondary coolant with respect to the primary coolant flow via the provision of flow baffles 394 on the shell side of the steam generating vessel 300. Referring to FIGS. 4, 7B, and 9B, two different configurations and sizes of baffle plates may be provided comprising a circular outer baffle 394a attached to steam generator shell 312 and having a central opening 394c, and a circular inner baffle 394b attached to riser pipe 337 and having a central opening 394d. Outer baffle 394a has a central opening 394c (i.e. circular) with a diameter larger than the diameter of the riser pipe 337 forming a lateral outside gap between the riser pipe and baffle, and an outside diameter slightly smaller than the inside diameter of the shell 312 for attachment thereto. Inner baffle 394b has a central opening 394d with a diameter slightly larger than the riser pipe 337 for attachment thereto, and an outside diameter smaller than the inside diameter of the steam generator shell 312 forming a lateral outside gap between the outer baffle. This arrangement advantageously causes the secondary coolant to flow through the preheater section 320 in the circuitous path shown (see directional flow arrows in FIG. 4) which maximizes contact time and heat transfer between the tubes 332 heated on the tube side by the primary coolant and the secondary coolant feedwater flowing on the shell side of the steam generating vessel 300. The inner and outer baffles 394b, 394a are arranged in an alternating pattern in the vertical direction to produce a combination of a perpendicular cross-flow pattern and parallel counter-flow pattern of the liquid secondary coolant with respect to the primary coolant through the preheater section 320 (see, e.g. directional arrows FIGS. 4 and 9B). The baffle plates 394a, 394c in the shell side space are therefore shaped to promote a combination of either radially symmetric cross flow or axially symmetric longitudinal flow of the shell side fluid.

In certain embodiments, the steam generator section 330 and/or superheater section 350 may include baffles similar to baffles 394a and 394b shown in FIGS. 4, 7B, and 9B. The tube support system (baffles) in each zone is configured to promote radially symmetric flow. Radially symmetric flow fields are desired to prevent bowing or bending of the steam generator shell 312 from circumferential thermal gradients.

Figure 9:
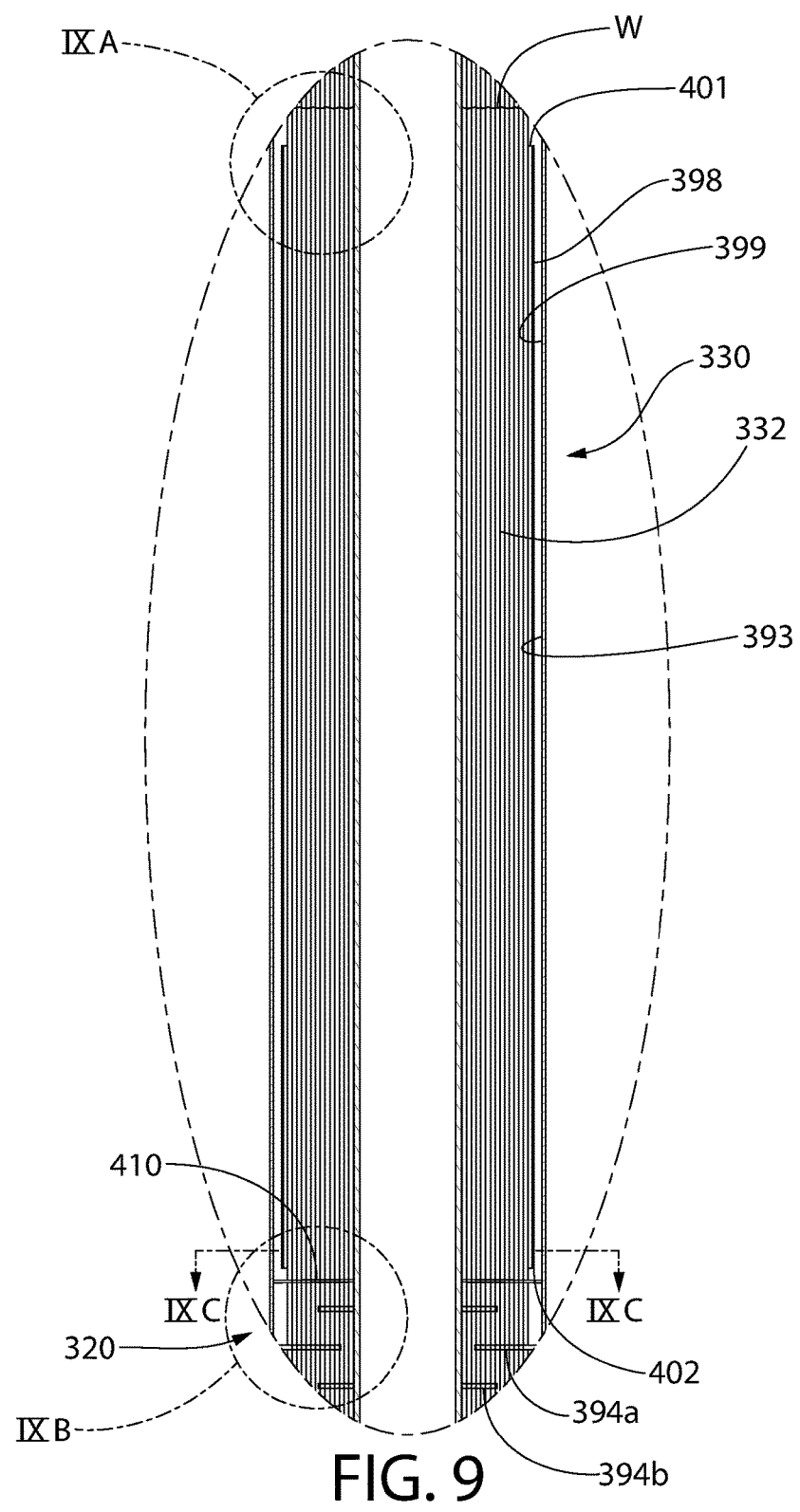
FIG. 9 is an enlarged detail from FIG. 7B showing primarily the steam generator section of the steam generator.
Figure 9C:
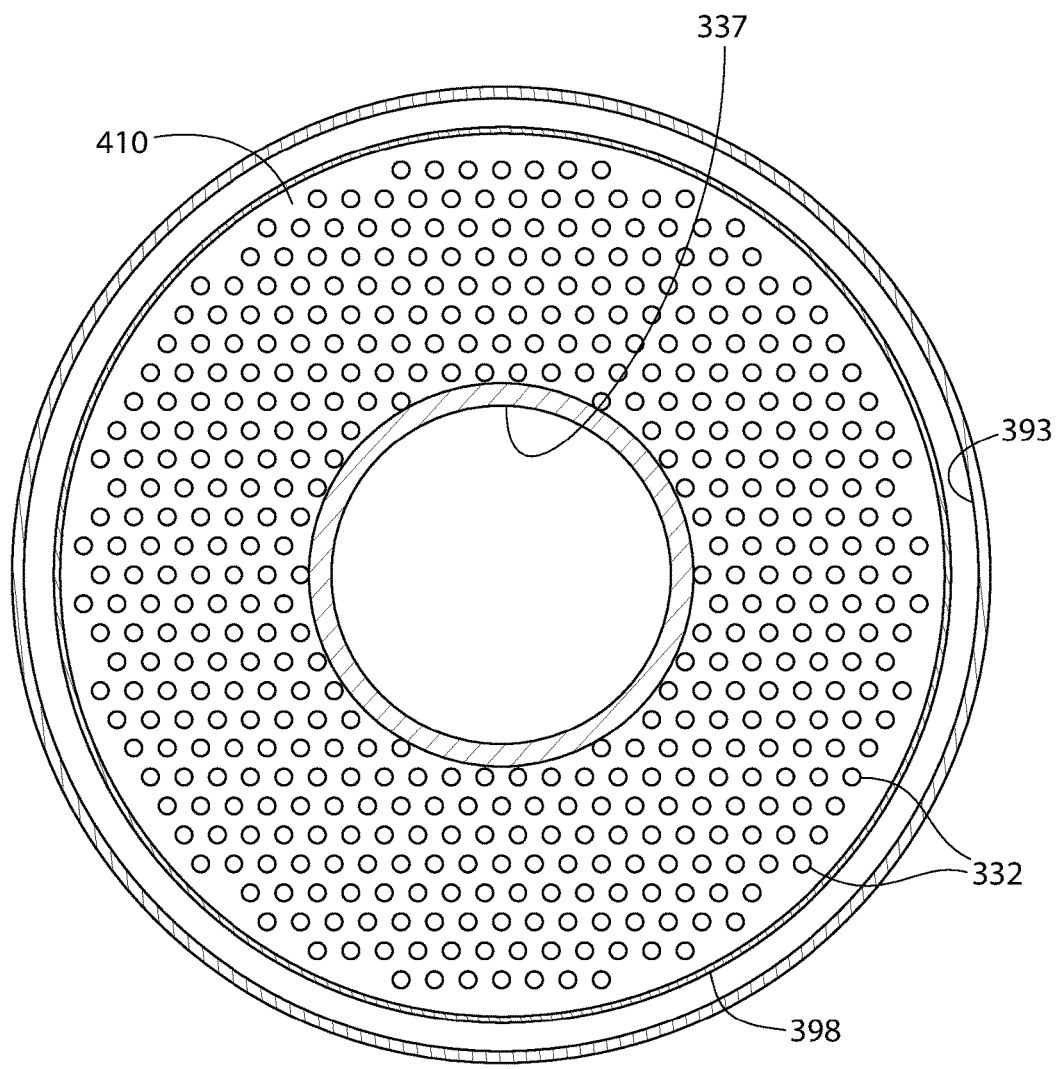
FIG. 9C is a cross-sectional view from FIG. 9.

Referring to FIGS. 9, 9B, and 9C, the interface between the preheater and the steam generator section 320, 330 zones in one embodiment may be demarcated by a relatively thick interface plate 410 which has a plurality of drilled and polished holes to form an extremely tight fit around the tubes (e.g. radial gap to the tube less than 1/64 inch). In other configurations, the interface plate may be omitted.

Both the bottom tubesheet 333b and the interface plate 410 may have slightly convex top surfaces so that any contaminants or debris produced by boiling the secondary coolant that may tend to settle on them are swept to the outer periphery of the steam generating vessel 300 from which they can be evacuated through suitably sized "blow down" openings in the steam generator shell 312 (not shown) periodically.

The foregoing tubular heat exchangers (i.e. preheater, steam generator, and superheater) are hydraulically connected in series on both the tube side (reactor primary coolant) and the shellside (the secondary coolant forming the working fluid of the Rankine Cycle which changes phase from liquid to superheated gas).

Figure 7A:
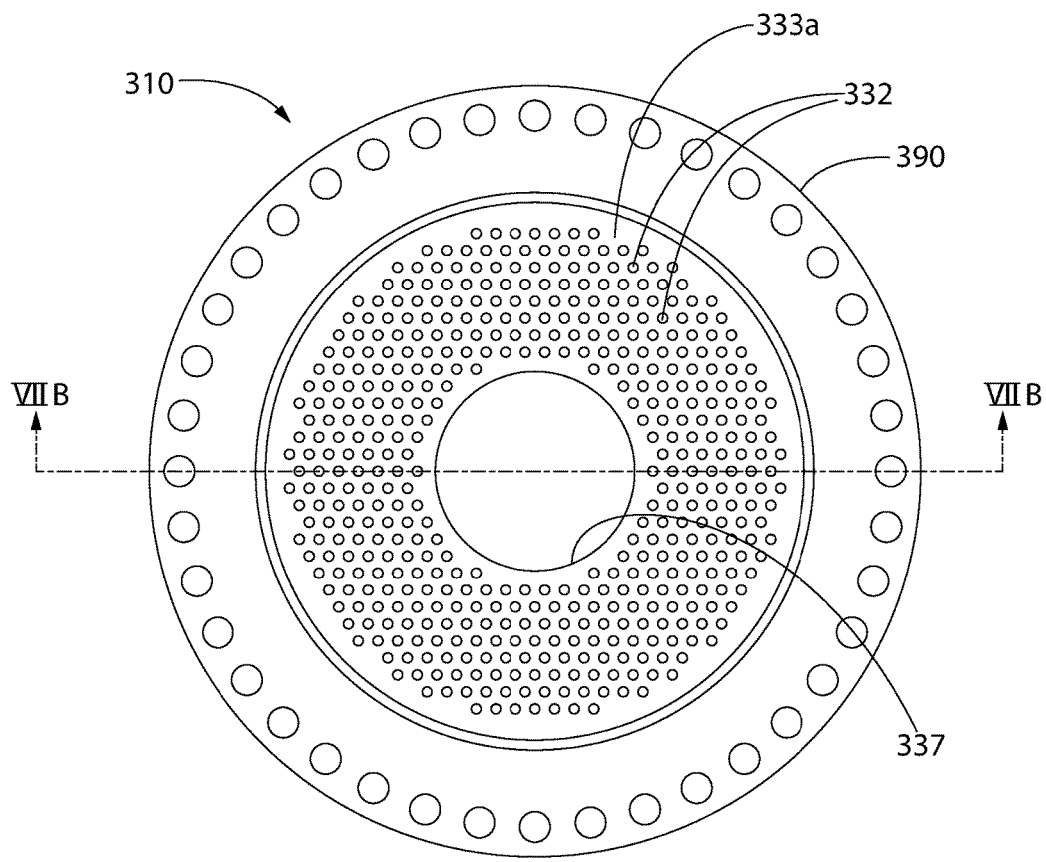
FIG. 7A is a top plan view of the steam generator with pressurizer removed.
Figure 7B:
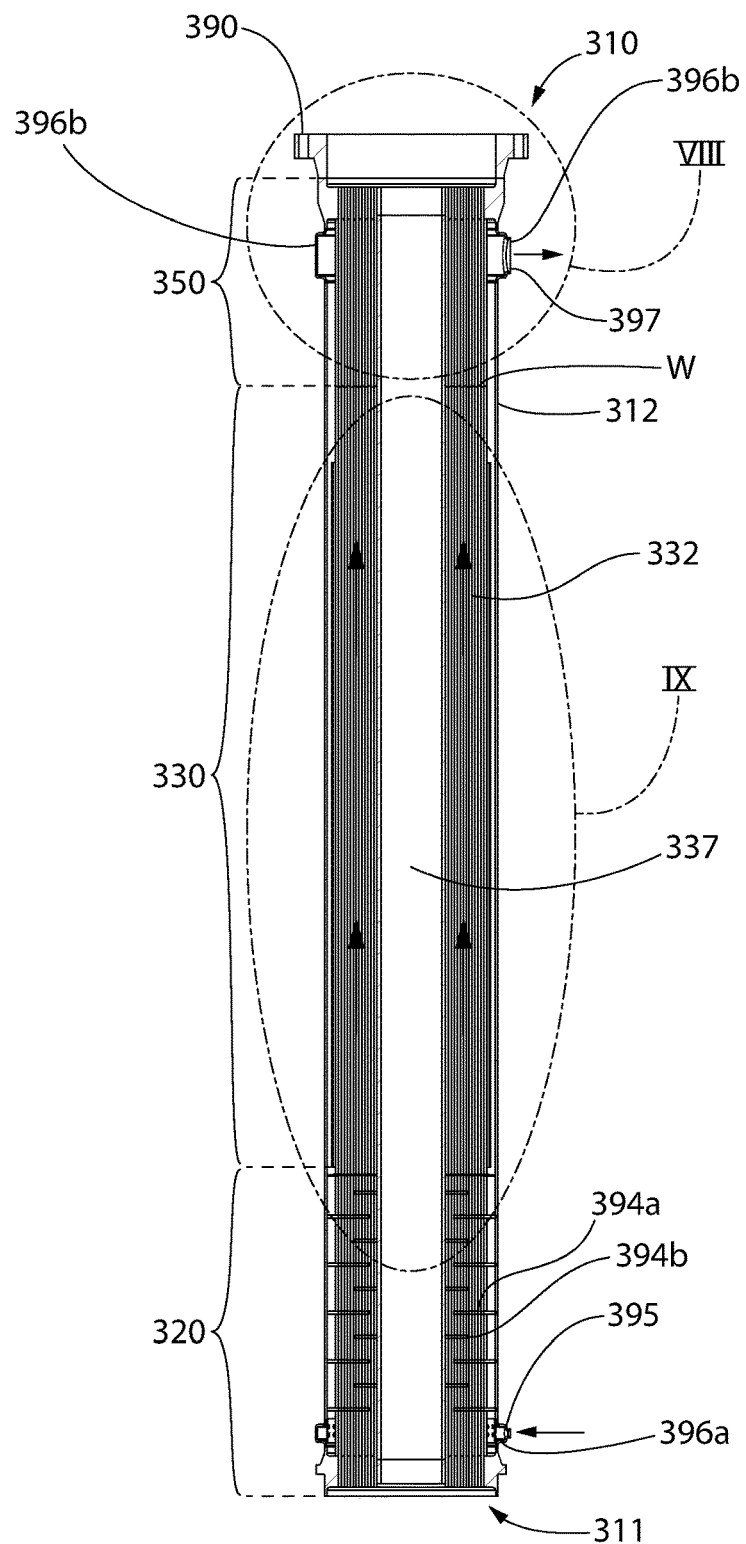
FIG. 7B is a side cross-sectional view thereof.
Figure 8:
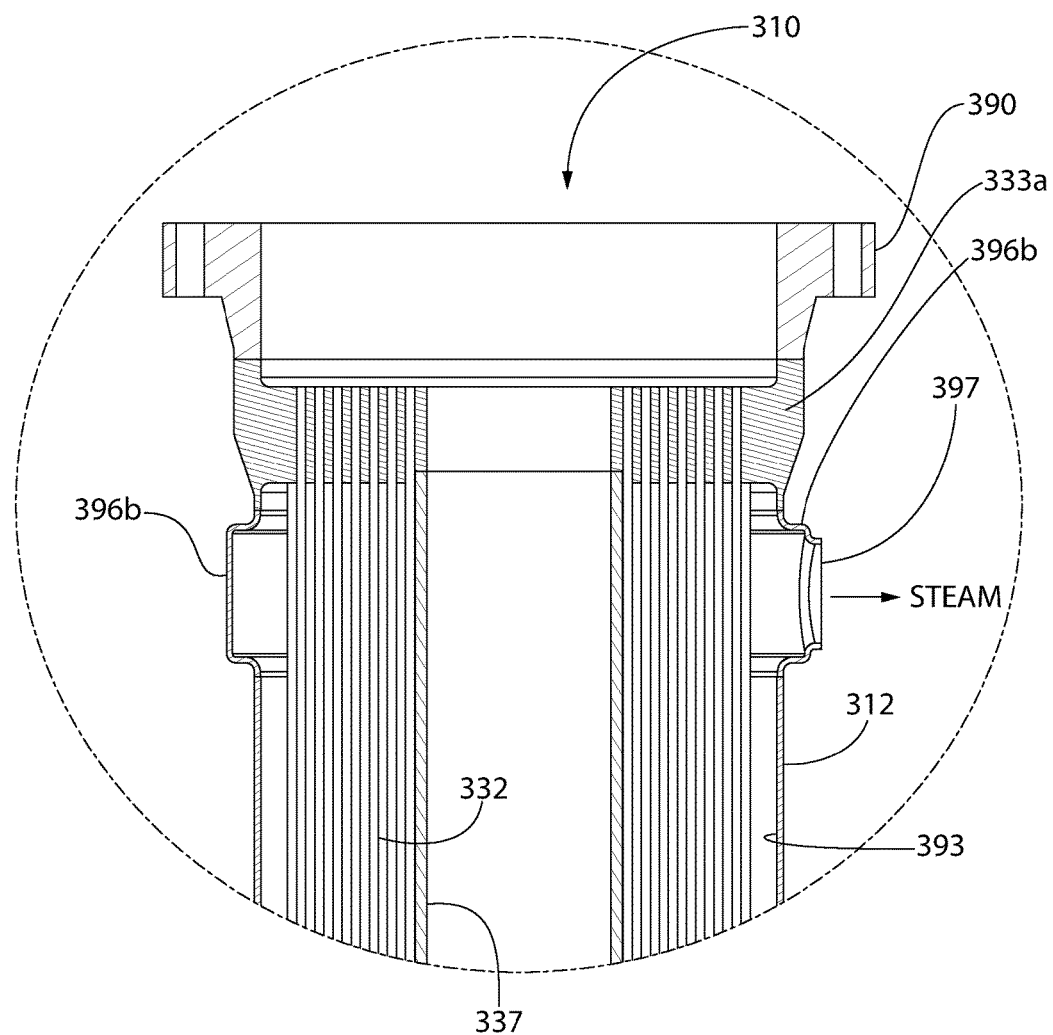
FIG. 8 is an enlarged detail from FIG. 7B showing the top of the steam generator and upper portion of the superheater section.

The top 310 of the steam generating vessel 300 may be terminated with flanged connection 390 which couples the pressurizer 380 to the vessel (see, e.g. FIGS. 7A, 7B, and 8). The bottom tubesheet 333b forms the bottom 311 of steam generating vessel 300 and is directly connected to the steam generating vessel shell 312 (see, e.g. FIG. 4).

Pressurizer 380 is mounted to top 310 of steam generating vessel 300 and is in fluid communication with both the top or outlet of riser pipe 337 and the inlet to superheater tubes 332. Pressurizer 380 which features a cylindrically-curved shell of revolution includes internal features to maintain a quiescent mass of water therein while ensuring a communicable relationship with the primary coolant water coursing through the top of the steam generating vessel 300 in the top distribution plenum 391 (see, e.g. FIG. 2). The pressurizer 380 has conventional electric heaters and spray nozzles to control primary coolant pressure. The pressurizer 380 may therefore generally include a heating/quenching element (i.e. water/steam) for pressure control of the reactor primary coolant. The element is comprised of a bank of electric heaters which are installed in the pressurizer section that serve to increase the pressure by boiling some of the primary coolant and creating a steam bubble that resides at the top of the pressurizer near the head (above the liquid/gas interface 392 of the primary coolant). A water spray column is located near the top head of the pressurizer which sprays water into the steam bubble thereby condensing the steam and reducing the size of the steam bubble. The increase/decrease in size of the steam bubble serves to increase/decrease the pressure of the primary coolant inside the reactor coolant system. In one exemplary embodiment, a representative primary coolant pressure maintained by the pressurizer 380 and heating/quenching element 381 may be without limitation about 2,250 psi. In alternative embodiments, a liquid/gas interface may be formed between an inert gas, such as nitrogen ($N_2$) supplied by supply tanks connected to the pressurizer 380, and the liquid primary coolant.

The pressurizer 380 defines a top distribution plenum 391 which collects reactor primary coolant rising through riser pipe 337 and distributes the primary coolant to the inlet of each of the tubes 332 penetrating the top tubesheet 333a. Plenum 391 resides above the top tubesheet 333a within the pressurizer forming a liquid reserve of primary coolant. Top tubesheet 333a may be recessed below the top 310 of steam generating vessel 300 (best shown in FIG. 8) to facilitate formation of the plenum. The depth of the plenum 391 may vary depending on the exact location of the liquid/gas interface 392; however, the depth of primary coolant in the plenum is preferably sufficient to cover the tubes 332 and tubesheet 333a and evenly distribute the primary coolant from the riser pipe 337 to the inlet ends of each of the tubes 332 penetrating the tubesheet.

Referring to FIGS. 1, 4, and 7-9, steam generating vessel 300 includes a secondary coolant inlet nozzle 395 which is fluidly connected to steam generator shell 312 for introducing liquid secondary coolant feedwater into the bottom of the preheater section 320. In one embodiment, the inlet nozzle 395 may be attached to shell 312 at one of two radially projecting expansion joints 396a, 396b formed integrally with the shell in the preheater section 320 as best shown in FIG. 4. The expansion joints may have a box-like configuration in cross-section as shown and encircle the shell 312 of the steam generating vessel 300 for accommodating thermal growth in length/height of the steam generating vessel 300. The risk of high tube stresses due to differential expansion between the tubes 332 and the steam generator shell 312 advantageously is mitigated by the flanged and flued expansion joints 396a, 396b located near the top and bottom tubesheets 333a, 333b.

Steam generating vessel 300 also includes a secondary coolant outlet nozzle 397 which is fluidly connected to steam generator shell 312 for withdrawing secondary coolant superheated steam from the superheater section 350. In one embodiment, the outlet nozzle 397 may be attached to shell 312 at the second radially projecting expansion joints 396b formed integrally with the shell in the superheater section 350 as best shown in FIG. 8.

Although steam generator 301 includes straight heat transfer tubes 332, the steam generator vessel 300 may be configured to form a recirculating type steam generator. Referring to FIGS. 2 and 7-9, the steam generator section 330 in one embodiment of a steam generator 301 includes a tubular recirculation shroud 398 having a diameter smaller than the inside diameter of the steam generator vessel shell 312 forming an annular downcomer 399 between the shell and shroud for recirculating liquid secondary coolant. The bundle of heat transfer tubes 332 is disposed inside the shroud 398. The top 401 of the shroud is spaced below the water level W in the steam generator 301 forming the steam-liquid interface at the superheater section 350 of the tube bundle (see, e.g. FIG. 9A). Accordingly, the shroud 398 is wetted at all times during normal operation of the steam generator. The water level W may be maintained within a narrow range by a conventional level controller (not shown) such that the shroud 398 in the steam generator section 330 is submerged in water (primary coolant) at all times. The heat transfer surfaces and flow areas are sized such that the re-circulation ratio (ratio of the re-circulation flow rate to the steam generation rate) is approximately 5 in one non-limiting embodiment. On the opposite end, the bottom 402 of the recirculation shroud is disposed above and proximate to the top of the preheater section 320 of the tube bundle above the interface plate 410 (see, e.g. FIG. 9B).

In operation, liquid secondary coolant flows upward on the shell side inside the shroud 398 towards the water lever W as it is heated by the tubes 332 (primary coolant flowing downwards therein on the tube side). The fluid rises as it becomes less dense from heating and boils producing steam. The reserve of secondary coolant not converted into steam cools further and flows radially outwards into the top of the annular downcomer 399 and flows downward towards the preheater section 320. The secondary coolant in the downcomer 399 then reverses direction and re-enters the bottom of the shroud mixing and flowing upwards again with the secondary coolant leaving the preheater section 320 to complete the recirculation flow loop.

The steam generating vessel 200 may be supported by a gusseted cylindrical flanged support skirt 400. FIGS. 4 and 5 show the support skirt in greater detail. The support skirt 400 is attached to the bottom 311 of the steam generator vessel 300 in one arrangement. Support skirt 400 is structurally robust and may have a double-flanged arrangement comprising a radially projecting top bearing flange 405, radially projecting bottom base flange 404, and a circumferentially extending vertical wall 407 extending between the flanges. Wall 407 forms a circular enclosure (in transverse cross section) at least partially or fully surrounding the primary coolant fluid coupling 273 as shown. In various configurations, the support skirt 400 may be circumferentially continuous for 360 degrees or extend circumferentially less than 360 degrees.

The bearing flange 405 and base flange 404 are diametrically enlarged with respect to the wall 407 thereby projecting beyond the wall. Base flange 404 is configured for seating on and attachment to divider wall 114 of the containment vessel 110 to transfer the dead weight of the steam generator 301 to the vessel (see also FIG. 11). Base flange 404 may be attached to divider wall 114 by any suitable means. In one embodiment, the base 404 may be attached with bolting such as a plurality of anchor bolts 408 spaced circumferentially apart. The base flange 404 and vertical wall 407 form an angled flanged arrangement.

In one embodiment, the bottom tubesheet 333b includes a diametrically enlarged and radially projecting flange 406 which is configured and dimensioned to engage the top bearing flange 405 of the support skirt 400. Flange 406 is an integral unitary structural part of the tubesheet 333b. Accordingly, the bottom tubesheet 33b serves a dual function as a flow and support device. The flange 406 forms an annular stepped surface 409 around the perimeter of tubesheet 333b to positively engage the top bearing flange 405 and prevent lateral movement of the bottom of the steam generating vessel 300 during a seismic event. The bottom tubesheet flange 406 is therefore machined or formed to serve as the transmission path for the weight of the steam generator unit to the support foundation (e.g. divider wall 114) via the flanged support skirt 400. In other possible embodiments, the tubesheet flange 406 may be formed separately on the steam generating vessel 300 from the tubesheet 333b.

The steam generator support skirt 400 further includes a plurality of vertically oriented stiffeners 403 extending between the bearing and base flanges 405, 404. The stiffeners 403 are circumferentially spaced apart and formed of structure plate which may be cut an angle as shown (see, e.g. FIGS. 4 and 5). The support skirt 400 including stiffeners 403, flanges 404, 405, and wall 407 are preferably made of structural steel plate of suitable thickness to bear the weight of a steam generator 301 containing secondary coolant during operating conditions.

In one non-limiting embodiment, the steam generating vessel 300 and other components herein described exposed to moisture may be made of a corrosion resistant metal such as stainless steel and/or steel with a corrosion resistant liner or coating. Other types of metals may be used.

The flow path of the reactor primary coolant and secondary coolant for the Rankine cycle will now be described. FIG. 12 shows the reactor primary coolant flowpath via directional flow arrows (i.e. primary coolant flow loop). FIGS. 1-4 and 6-9 show the secondary coolant flowpath of the Rankine cycle through steam generating vessel 300 via directional arrows. Primary coolant flows on the tube side of the steam generating vessel 300 and secondary coolant flows on the shell side.

Cooled primary coolant ("cold") leaves steam generating vessel 300 through outlet nozzle 370 and enters reactor vessel 200 through outer inlet nozzle 270. The primary coolant flows downwards through annular downcomer 222 enters the bottom of riser column 224. The primary coolant flows upwards through fuel cartridge 230 and is heated by convection and conduction in the fuel core. The now heated or "hot" primary coolant exits the reactor vessel 200 through outer inlet nozzle 270 and enters steam generating vessel 300 through inlet nozzle 371. The hot primary coolant flows vertically upwards in riser pipe 337 and is directed to the top of the "stack" into the top distribution plenum 391 formed by the pressurizer 380. The hot primary coolant enters the tubes 332 through penetrations in top tubesheet 333a and reverses direction to begin the downwards journey through steam generating vessel 200 in the tubes. The hot primary coolant first flows down through the superheater 350 on the tube side of the tube bundle which has wet saturated steam (secondary coolant) flowing upwards on the shell side from the steam generator 230 below in the stack. The saturated steam becomes superheated and is dried by the primary water inside the tubes, which is flowing in counter flow to the rising steam mass. The counter-flow arrangement permits the steam to be superheated to within a few degree Fahrenheit of the reactor coolant's peak temperature, resulting in maximized thermodynamic efficiency. The superheated steam then leaves the steam generating vessel 300 via outlet nozzle 397.

Continuing the process, the now less hot coolant continues to flow down through the steam generating vessel 300 next proceeding through the steam generator 330 on the tube side. On the shell side, liquid secondary coolant undergoes a phase change and is turned to steam as the primary coolant is further cooled in giving up heat to the secondary coolant. The now further cooled primary coolant flows down through the preheater 320 on the tube side which encounters and preheats the cold (e.g. sub-cooled) liquid secondary coolant entering the shell side through the feedwater inlet nozzle 395 of the steam generator. The now cooled primary coolant has completed the closed flow loop through the steam generating vessel 300 and reactor vessel 200, and re-enters the reactor vessel through inlet nozzle 270 to repeat the foregoing flow process in the closed primary coolant flow loop.

In one embodiment, an exemplary non-limiting reactor vessel "hot" outlet temperature may be in a range of about and including 575 to 600 degrees F. An exemplary non-limiting reactor vessel "cold" inlet temperature may be in a range of about and including 350 to 385 degrees F. An exemplary reactor vessel operating pressure may be about 2,250 psi (pounds per square inch) which is maintained by pressurizer 380. Other suitable flow temperatures and pressures may be used depending on the heat transfer requirements of the specific application and Rankine cycle side steam production operating parameters. In one embodiment, the reactor vessel primary coolant may be unborated demineralized water.

In one exemplary embodiment, the shell 312 of steam generating vessel may be made of steel such as type 508 carbon steel. Tubesheets 333a, 333b may be made of the same steel with an Inconel cladding when the tubes 312 are made of Inconel. In other embodiments, these components may be formed of other suitable metal materials including stainless steel.

Other features and aspects of the steam generator 301 may include the following:

a. The tubes 332 and the riser shell or pipe 337 may be fastened to the two tubesheets 333a, 333b by conventional methods such as edge welding, butt welding, hydraulic expansion, roller expansion, or a combination thereof. In non-limiting preferred embodiments, the tubes 332 are fastened to the two tubesheets 333a, 333b by a high integrity joining process such as hydraulic expansion or explosion bonding. Roller expansion is not necessarily favored in all situations because it has an adverse effect on the service life of the tubes due to work hardening of the tube material in the rolled zone.

b. Either or both the steam generating vessel shell 312 and the riser pipe 337 may incorporate one or more "flexible shell elements" to acquire axial flexibility.

c. The tubes 332 and/or the riser pipe 337 may be installed in the tubesheets 333a, 333b such that they are in a prescribed state of pre-tension.

d. The shell side inlet and outlet nozzles 301, 302 are located close to the bottom and top tubesheets 333a, 333b, preferably in the shell 312 course of the "flexible shell elements" or expansion joints 396a, 396b.

e. A perforated impingement shell 411 is installed in each of the two expansion joints 396a, 396b wherein the inlet and outlet nozzles are situated to provide for an essentially radially symmetric entrance of feedwater secondary coolant and exit of heated steam from the steam generating vessel 300, respectively (see, e.g. FIG. 4).

Figure 6:
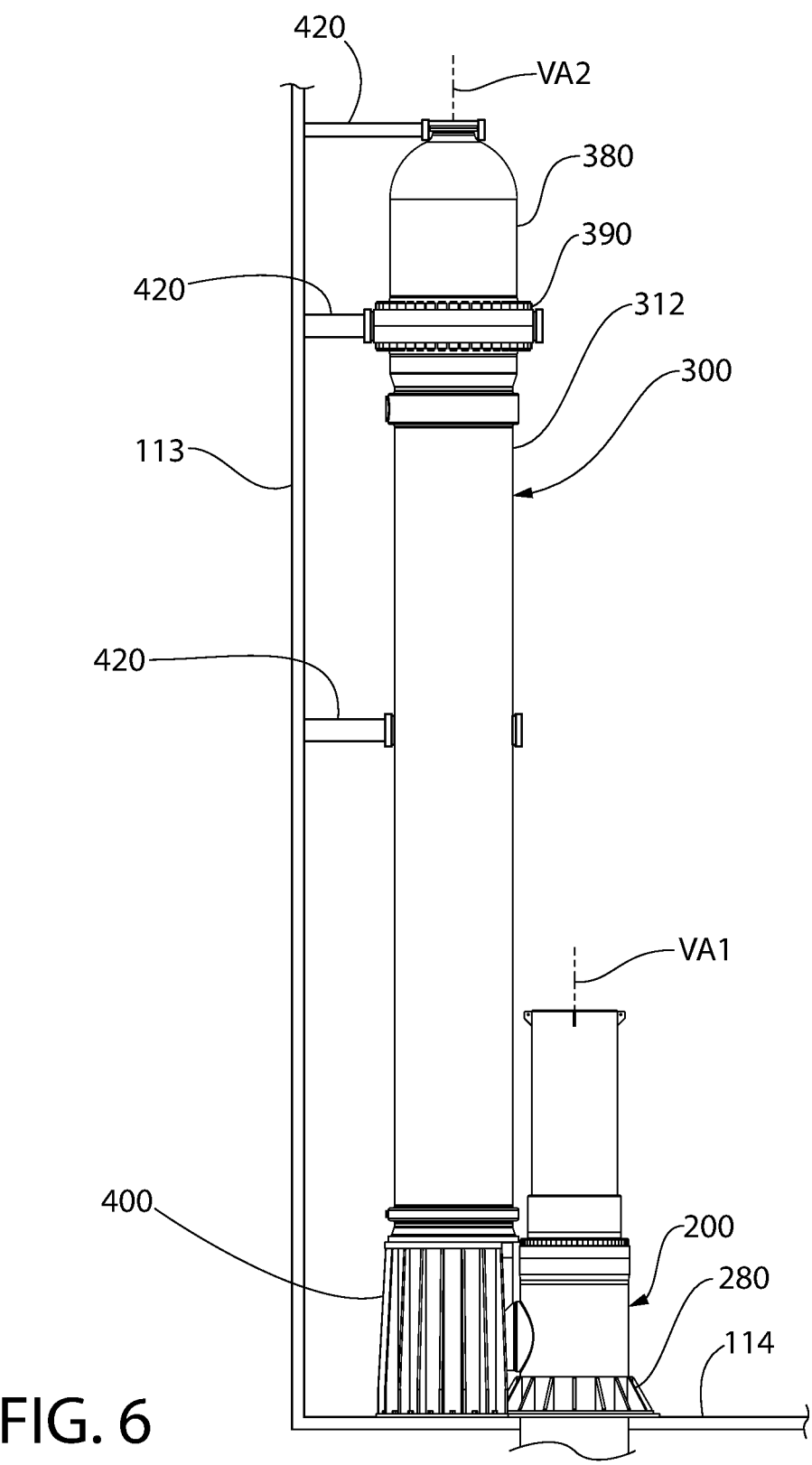
FIG. 6 is a side elevation view of the steam generator and reactor vessel showing a lateral restraint system.

The steam generator vessel 300 and pressurizer 380 may be laterally restrained at the four locations in one embodiment including proximate to the bottom tubesheet 333b, tope tubesheet 333a, near the mid-elevation of the steam generator shell 312, and the top of the pressurizer by lateral supports 420 (see, e.g. FIG. 6). In one embodiment, the support skirt 400 may provide the lateral restraint near the bottom tubesheet 333b. The lateral restraints 420 may be lined with an insulating material at their interface with the steam generating vessel shell 312 so as to prevent excessive heating of the structural material in the body of the restraints. The lateral restraints 420 may be equipped with a spring/damper material to reliably distribute the load on each during a seismic or mechanical loading event. The lateral supports 420 at mid-height of the steam generating vessel 300 and at the top tubesheet 333a location adjacent the flanged joint 390 shown advantageously help increase the beam mode frequency of the steam generator 301 in the rigid range. The lateral restraints further do not interfere with the axial vertical movement of the steam generator 301 along vertical axis VA2 due to thermal expansion.

While the invention has been described and illustrated in sufficient detail that those skilled in this art can readily make and use it, various alternatives, modifications, and improvements should become readily apparent without departing from the spirit and scope of the invention.

What is claimed is:

1. A nuclear steam supply system with natural gravity-driven coolant circulation, the system comprising:
a vertically-oriented reactor vessel comprising an elongated cylindrical shell forming an internal cavity configured for containing primary coolant and a nuclear reactor fuel core;
a vertically-oriented steam generating vessel comprising an elongated cylindrical shell defining an internal cavity configured for containing secondary coolant, a top tubesheet, and a bottom tubesheet;
a plurality of heat transfer tubes extending vertically between the top and bottom tubesheets, the tubes including a lower preheater section, an intermediate steam generator section, and an upper superheater section, wherein secondary coolant in a liquid state enters a shell side of the preheater section at a bottom of the steam generating vessel and flows upward to the steam generator section where a portion of the secondary coolant boils to produce steam which in turn flows upward into the superheater section at a top of the steam generating vessel;
a vertical riser pipe extending vertically between the top and bottom tubesheets, the riser pipe fluidly connected to the reactor vessel;
a fluid coupling forming a flow conduit for exchanging primary coolant between the steam generating vessel and reactor vessel; and
a tubular recirculation shroud surrounding the tubes in the steam generator section, the shroud configured to recirculate a portion of the liquid secondary coolant in the steam generator section back to the preheater section;
wherein primary coolant flows upward through the riser pipe and downward through the tubes on the tube side of the steam generating vessel to heat the secondary coolant.

2. The system according to claim 1, wherein the primary coolant flows in a parallel counter flow arrangement to the secondary coolant through the steam generating vessel.

3. The system according to claim 1, wherein a water level of secondary coolant is formed in the steam generating vessel above a top of the recirculation shroud, the water level defining a liquid-steam interface in which the recirculation shroud is submerged in the liquid secondary coolant.

4. The system according to claim 3, wherein the recirculation shroud forms an annular downcomer between the shroud and the shell of the steam generating vessel for recirculating the liquid secondary coolant, the liquid secondary coolant flowing downwards in the annular downcomer to the preheater section, reverses direction around a bottom of the recirculation shroud, and flows upwards inside the recirculation shroud back to the top of recirculation shroud to complete a recirculation flow loop.

5. The system according to claim 1, wherein the preheater section includes a plurality of horizontally oriented flow baffles configured to form a combination perpendicular cross-flow and parallel counter-flow pattern of secondary coolant flowing through the preheater.

6. The system according to claim 5, wherein the flows baffles include a first configuration of circular baffles attached to the shell of the steam generating vessel and a second configuration of circular baffles attached to the riser pipe.

7. The system according to claim 6, wherein the first and second configurations of baffles are arranged in an alternating pattern in a vertical direction to create a staggered shell-side fluid flow path through the preheater section.

8. The system according to claim 4, further comprising an interface plate forming a horizontally oriented demarcation between the preheater section from the steam generator section, the interface plate comprising a plurality of holes which receives the tubes which pass through interface plate.

9. The system according to claim 8, wherein the interface plate has a convex top surface to sweep debris to an outer periphery of the steam generating vessel.

10. The system according to claim 8, wherein the recirculation shroud terminates at a point spaced above and proximate to the interface plate.

11. A steam generator for a nuclear steam supply system, the steam generator comprising:
a vertically-oriented steam generating vessel comprising an elongated cylindrical shell defining an internal cavity configured for containing secondary coolant, a top tubesheet, a secondary coolant outlet nozzle proximate to the top tubesheet, a bottom tubesheet, and a secondary coolant inlet nozzle proximate to the bottom tubesheet;

a plurality of heat transfer tubes extending vertically between the top and bottom tubesheets, the tubes including a preheater section, a steam generator section, and a superheater section, wherein secondary coolant in a liquid state enters a shell side of the preheater section via the inlet nozzle and flows upward to the steam generator section where a portion of the secondary coolant boils to produce steam which in turn flows upward into the superheater section and exits the steam generating vessel through the outlet nozzle; and a vertical riser pipe extending vertically between the top and bottom tubesheets, the riser pipe in fluid communication with the tubes and configured for fluid coupling to a reactor vessel containing primary coolant;

a double-walled fluid coupling forming a flow conduit for exchanging primary coolant between the steam generating vessel and reactor vessel, the fluid coupling configured so that primary coolant from the reactor vessel flows through the fluid coupling into the steam generator riser pipe and returns from the steam generating vessel to the reactor vessel through the fluid coupling;

a bottom collection plenum formed below the bottom tubesheet by the fluid coupling and configured for fluid coupling to the reactor vessel, the collection plenum in fluid communication with the tubes;

a top distribution plenum formed above the top tubesheet, the distribution plenum in fluid communication with the riser pipe and tubes; and a tubular recirculation shroud surrounding the tubes in the steam generator section, the shroud configured to recirculate a portion of the liquid secondary coolant in the steam generator section back to the preheater section.

12. The steam generator according to claim 11, wherein the steam generating vessel is configured so that primary coolant flows upward through the riser pipe and downward through the tubes on a tube side of the steam generating vessel to heat the secondary coolant which flows upward on the shell side inside the recirculation shroud.

13. The steam generator according to claim 11, wherein a water level of secondary coolant is formed in the steam generating vessel above a top of the recirculation shroud, the water level defining a liquid-steam interface.

14. The system according to claim 12, wherein the recirculation shroud forms an annular downcomer between the shroud and the shell of the steam generating vessel for recirculating the liquid secondary coolant, the liquid secondary coolant flowing downwards in the annular downcomer to the preheater section, reverses direction around a bottom of the recirculation shroud, combines with the liquid secondary coolant exiting the preheater section, and the combined liquid secondary coolant flow flows upwards inside the recirculation shroud back to the top of recirculation shroud to complete a recirculation flow loop.

15. The system according to claim 14, further comprising a horizontally oriented interface plate forming a demarcation between the preheater section from the steam generator section, wherein the recirculation shroud terminates at a point spaced above and proximate to the interface plate which precludes the liquid secondary coolant flow from the annular downcomer from re-entering the preheater section.

16. The steam generator according to claim 11, wherein the preheater section includes a plurality of horizontally oriented flow baffles configured to form a combination perpendicular cross-flow and parallel counter-flow pattern of secondary coolant flowing through the preheater.

17. The steam generator according to claim 16, wherein the flows baffles include a first configuration of circular baffles attached to the shell of the steam generating vessel and a second configuration of circular baffles attached to the riser pipe.

18. The steam generator according to claim 17, wherein the first and second configurations of baffles are arranged in an alternating pattern in a vertical direction to create a staggered flow of liquid secondary coolant through the preheater section.

19. The steam generator according to claim 16, wherein the steam generator section does not include horizontal oriented flow baffles.

20. The steam generator according to claim 11, wherein the bottom tubesheet has a convexly rounded top surface.

* * * * *